United States Patent
Manninen

(10) Patent No.: US 9,816,215 B2
(45) Date of Patent: Nov. 14, 2017

(54) COMPRESSION RESISTANT, SELECTIVELY SLIT AND EMBOSSED FILMS AND INDUSTRIAL TEXTILES MADE THEREOF

(71) Applicant: ASTENJOHNSON, INC., Charleston, SC (US)

(72) Inventor: Allan R. Manninen, Stittsville (CA)

(73) Assignee: ASTENJOHNSON, INC., Charleston, SC (US)

( * ) Notice: Subject to any disclaimer, the term of this patent is extended or adjusted under 35 U.S.C. 154(b) by 340 days.

(21) Appl. No.: 14/405,842

(22) PCT Filed: Jun. 6, 2013

(86) PCT No.: PCT/CA2013/000553
§ 371 (c)(1),
(2) Date: Dec. 5, 2014

(87) PCT Pub. No.: WO2013/181748
PCT Pub. Date: Dec. 12, 2013

(65) Prior Publication Data
US 2015/0167215 A1 Jun. 18, 2015

(30) Foreign Application Priority Data
Jun. 7, 2012 (CA) ..................... 2779131

(51) Int. Cl.
*B32B 3/24* (2006.01)
*D04H 13/00* (2006.01)
(Continued)

(52) U.S. Cl.
CPC ............. *D04H 13/00* (2013.01); *B29D 29/06* (2013.01); *B32B 38/0004* (2013.01);
(Continued)

(58) Field of Classification Search
CPC ............. D04H 13/00; Y10T 428/24281; Y10T 428/24744; Y10T 428/24661
See application file for complete search history.

(56) References Cited

U.S. PATENT DOCUMENTS 1,918,149 A * 7/1933 Sullivan ................. E04B 1/86
181/207
2,043,987 A * 6/1936 Brown .................... E04B 1/86
428/132

(Continued)

FOREIGN PATENT DOCUMENTS

WO       0183199 A1    11/2001

OTHER PUBLICATIONS

International Search Report and the Written Opinion; PCT/CA2013/000553; International Filing Date: Jun. 6, 2013; AstenJohnson, Inc.; 8 pgs.

*Primary Examiner* — William P Watkins, III
(74) *Attorney, Agent, or Firm* — Fish IP Law, LLC

(57) ABSTRACT

A film for conveying in an industrial process, industrial fabrics made from the film, and methods of manufacture. The film has a plurality of protrusions separated by land areas. Each protrusion comprises a top member having opposing lateral edges and is supported by opposed compression resistant first and second end walls, which with at least one of the lateral edges define an aperture extending through the film to provide a flow path. The base edge of each end wall has a configuration selected from at least one of the base edge being convexly curved away from the protrusion body; and each end wall extending below at least a part of each of the first and second lateral edges and being connected to each of the first and second lateral edges. The film structure provides physical properties equivalent to a woven fabric, with improved strength, stability and compression resistance.

20 Claims, 21 Drawing Sheets

(51) Int. Cl.
*B29D 29/06* (2006.01)
*B32B 38/00* (2006.01)
(52) U.S. Cl.
CPC ...... *B32B 2367/00* (2013.01); *D10B 2401/06* (2013.01); *D10B 2403/0331* (2013.01); *D10B 2505/00* (2013.01); *Y10T 156/1057* (2015.01); *Y10T 428/24281* (2015.01)

(56) References Cited

U.S. PATENT DOCUMENTS 4,415,398 A 11/1983 Ottaviano
2012/0244311 A1 9/2012 Manninen \* cited by examiner

COMPRESSION RESISTANT, SELECTIVELY SLIT AND EMBOSSED FILMS AND INDUSTRIAL TEXTILES MADE THEREOF

FIELD OF THE INVENTION

The invention concerns industrial textiles made from at least one layer of selectively slit and profiled films. It is particularly concerned with such textiles in which the thermoformed protrusions and openings are structured and arranged so that, when two similarly formed film layers are bonded together in alignment, the resulting structure is resistant to compressive loading and provides a desired permeability.

BACKGROUND

Industrial textiles used in filtration, conveyance and similar continuous processes have typically been manufactured by interweaving synthetic yarns according to a selected weave pattern to provide either the entire fabric, or only a base body portion which may subsequently be either encapsulated (e.g. with polyurethane or other similar rugged material) or needled to attach a nonwoven batt material. Such fabrics have been satisfactory for these uses, but the cost of their production is high, particularly when the fabrics must be finely and precisely woven using relatively small yarns and large industrial looms. Further, these fabrics must be rendered endless in some manner, either by installing a seaming element at their opposed longitudinal ends, or by re-weaving the longitudinal yarns back into the fabric structure to form seaming loops or similar joining means, for secure connection by a pintle, coil or similar securing means. It is also known to weave such fabrics in an endless manner, to form a continuous tube, or to assemble successive turns of a narrow woven or nonwoven strip arranged in side-by-side relation to build up a desired length and width of finished fabric.

It will be appreciated that these fabrics are expensive and time consuming to produce, and require a high capital investment in industrial looms and related equipment for subsequent processing, as well as a skilled workforce to operate the equipment and produce an acceptable finished product. The fabrics themselves must be highly stable, resistant to abrasive wear and both chemical and thermal degradation caused by the environments in which they are used.

Various proposals have been made to reduce the manufacturing costs and technical difficulties associated with making these woven textiles by creating them using nonwoven materials. For example, it is known to produce industrial fabrics from one or more layers of film or other continuous media, and to provide perforations, profiling or other treatment prior to assembly. See for example WO 2010/088283, WO 2010/088280, WO 2010/068778, WO 2010/068765, WO 2010/030570, WO 2010/030547 and WO 2010/030298, all commonly assigned to Albany International Corp., which disclose various industrial fabrics formed from continuous strips of a film and which are intended for use in the manufacture of various sheet-like products. In general, the fabrics disclosed in these references are comprised of narrow thermoplastic polymeric strips, such as industrial strapping material, which have been laser drilled to impart porosity.

Other paper machine clothing into which a film-like component has been incorporated are described in various patents, for example U.S. Pat. No. 6,071,837 (Crook), U.S. Pat. No. 6,436,240 (Jeffrey), U.S. Pat. No. 6,531,418 (Lidar et al.), U.S. Pat. No. 6,989,080 (Hansen), and U.S. Pat. No. 7,323,087 (Beck). Other apertured films, and processes for their manufacture, to provide textiles for various industrial applications, are known. For example, U.S. Pat. No. 4,842,794, U.S. Pat. No. 5,207,962, and U.S. Pat. No. 5,262,107 all to Hovis et al., disclose fabrics and processes for forming the same including an apertured thermoplastic film which has been deformed by means of a patterned embossing roll. U.S. Pat. No. 3,162,567 (Heller) discloses a papermakers forming fabric made from a sheet of metal or film which has been punched to form arched portions which extend out of the plane of the sheet to provide drainage openings which are at an angle to the plane of the sheet.

However, none of the references noted above discloses a fabric having the advantageous properties of woven fabrics intended for industrial filtration and similar uses, and which are constructed from two or more layers of a polymer film, each of which has been contoured by providing a combination of an embossing or similar process to raise portions of the film above its general plane to form protrusions, and slit to create apertures at the raised portions.

It would therefore be highly desirable to provide a simple, relatively less expensive process for the use of polymer films for the construction of nonwoven textiles possessing most or all of the advantageous properties of the known woven industrial fabrics, without the disadvantages and cost of the steps required to produce such woven fabrics.

WO 2011/069259 (Manninen) discloses the use of selectively slit and embossed films in the manufacture of industrial textiles. As disclosed, the fabrics are comprised of at least two layers of planar polymeric film each of which is selectively slit and embossed to impart surface contouring and other properties similar to those resulting from various weave designs for woven fabrics. According to the method of manufacture disclosed in the '259 document, the film is pressed by application of heat and pressure using a chosen mold pattern so as to selectively and permanently deform portions out of plane; a slitting process is used to create apertures at the deformations to allow the passage of fluids such as air and water through the fabric. The length of the individual slits is equal to the length of the aperture formed in the film. The document also discloses that a two layer fabric can be provided in which a first layer of a suitably slit and embossed film is mated with a second similarly imprinted sheet so that the outer surfaces of the deformations formed by the embossing processes face one another.

FIGS. 1 to 4 show a prior art film for use in a fabric such as is described in WO 2011/069259 (Manninen). As shown in FIGS. 1 and 2, a polymeric film 12 is selectively deformed and slit to provide protrusions 50 having top surfaces 51 and angled sides 52; the protrusions 50 define apertures 40 and are spaced apart such that flat land areas 60 exist between them. FIG. 2 provides a cross-sectional view of the protrusions 50, their top surfaces 51 and angled sides 52, and land areas 60 shown in perspective in FIG. 1. FIG. 3 shows a detailed view of an assembled film fabric according to the '259 document. As shown in FIG. 3, two similarly slit and profiled film layers 80 and 90 are joined together such that the top surfaces 51 of a plurality of protrusions 50 of one layer such as 80 are in contact with land areas 60 of second film layer such as 90. The two film layers 80 and 90 are then bonded such as by welding to one another to form the eventual completed fabric which is arranged in the manner shown in cross-section in FIG. 4. As can be seen in this Figure, the two film layers 80 and 90 are joined to one another and spaces such as 70 are maintained and defined between them by the angled sides 52 of the protrusions 50. These angled sides 52 may provide adequate support to keep the film layers 80 and 90 apart so that the openings such as 70 are maintained, but this structure may have less than desirable resistance to repetitive compressive loading, in particular because there is no material remaining at the sides (i.e. along the sides of apertures 40) of the protrusions to support the top surfaces 51 and angled sides 52; it has been entirely removed by the slitting process and so there is no material reinforcement. Further, the shape of angled sides 52 is such that there is no inherent support in them other than the bend where angled side 52 transitions to top surface 51. In addition, there is no simple means to adjust the number of openings in the film, and their size, without changing the embossing pattern which is both costly and time consuming.

Fabrics such as are disclosed in the '259 document have been constructed, tested and found to be generally satisfactory for use in the applications for which they are intended. However, in certain situations, where the textile is to be exposed to repetitive compressive loading while in operation, it may be desirable to augment its ability to resist such compression and thereby maintain void volume between its layers, as well as permeability. If the protrusions 50 are compressed or flattened, the apertures 40 may become restricted, thus altering the permeability and other desirable fabric properties. It would also be advantageous if the permeability of the fabric could be easily adjusted so as to suit exactly the requirements of the application for which it is intended.

It would also be advantageous to provide a protrusion design which either builds in support to angled sides 52 (i.e. the support is inherent in its shape) or retains some material to buttress top surfaces 51 of the protrusions 50, combined with a slitting pattern which is adjustable as required in either or both the longitudinal and cross directions so as to impart a desired level of permeability to the resulting film fabric structure.

It has now been found that, in the slit and embossed prior art film fabrics, the stiffness (resistance to compression) of the protrusions can be significantly improved by either replacing the rectilinear configuration of the prior art design with curved surfaces or shells, or by changing the size and/or orientation of the slits 30 so as to leave behind material to support the sides and tops of the protrusions, while easily imparting a desired permeability to the fabric in a manner that does not detract from desired physical properties, and does not require a change in the molding pattern used to form the protrusions.

As used herein, the term "shell" is used in its structural sense and generally refers to an essentially two-dimensional plate which has been curved in at least one dimension, or as many as three. A primary difference between a shell structure and a plate structure is that, in the unstressed state, the shell structure has curvature as opposed to plate structures which are flat. Where a flat plate acts in a similar manner to a beam with bending and shear stresses, shells are analogous to a cable which resists loads through tensile stresses. Shell structures are common in nature and structural engineering, and include familiar objects such as eggs, ships' hulls or domes. Shell structures which provide effective support when a line of thrust acts on their curved cross-section are of particular interest as they have appreciable bending stiffness. These out-of-plane regions are shaped such that: (1) the depth of the cross section is increased giving increased area moment of inertia, I; (2) the depth of cross section is continuously varied along the length of the beam/arch; and (3) curved beams or arches are produced to reduce the compressive deflections of the out-of-plane region. The bending stiffness, EI, of a member increases with increasing area moment of inertia, I. So, in general, the greater the curvature of the shell, the more effectively it will resist compressive loading due to its inherent bending stiffness. The present invention utilizes in part the structural benefits provided by the curved profiles of shells in the design of walls of the protrusions so as to enhance their resistance to compressive loading by increasing their bending stiffness; this will in turn assist the fabric to maintain void volume while under compressive load.

The present invention addresses and provides an effective solution to the above and other difficulties and limitations of the prior art.

SUMMARY OF THE INVENTION

The invention therefore seeks to provide a film for conveying in an industrial process, the film having
  (i) an upper surface and a lower surface; and
  (ii) a plurality of protrusions separated by land areas and defining a profile of the upper surface, wherein
    each protrusion has a body comprising a top member having opposed first and second lateral edges and is supported by opposed compression resistant first and second end walls, at least one of the lateral edges cooperating with the end walls to define an aperture extending from the upper surface to the lower surface, each end wall having a base edge connected to an adjacent land area and having a configuration selected from at least one of
    (a) the base edge being convexly curved away from the protrusion body; and
    (b) each end wall extending below at least a part of each of the first and second lateral edges and being connected to each of the first and second lateral edges.

Preferably, the top member is substantially planar. Preferably each aperture has a linear lower edge. Optionally, each base edge is substantially semicircular. Preferably the protrusion body has a lower perimeter comprising a configuration selected from an ellipse, a circle and a rectangle.

The invention further seeks to provide a nonwoven industrial fabric for conveying in an industrial process, comprising at least one layer of a film, the film having
  (i) an upper surface and a lower surface; and
  (ii) a plurality of protrusions separated by land areas and defining a profile of the upper surface, wherein
    each protrusion has a body comprising a top member having opposed first and second lateral edges and is supported by opposed compression resistant first and second end walls, at least one of the lateral edges cooperating with the end walls to define an aperture extending from the upper surface to the lower surface, each end wall having a base edge connected to an adjacent land area and having a configuration selected from at least one of
    (a) the base edge being convexly curved away from the protrusion body; and
    (b) each end wall extending below at least a part of each of the first and second lateral edges and being connected to each of the first and second lateral edges.

The nonwoven industrial fabric comprises at least one layer of a film according to the invention.

Preferably, the fabric further comprises a fabric body having a first seamable end and a second seamable end, a first seaming element provided at the first seamable end and a second seaming element provided at the second seamable end, wherein the first and second seaming elements are constructed and arranged to be secured together to form a seam. Optionally, at least one of the first seaming element and the second seaming element is integrally constructed with the fabric body at the respective seamable end.

Preferably, each seaming element comprises loops and openings arranged at a selected frequency, and a pitch $P_E$ of the protrusions across a width of each seamable end is related to a frequency $P_L$ of seaming loops across said width according to the following equation:

$$P_E(2m+1)=nP_L$$

where m and n are positive integers.

The invention further seeks to provide a method of constructing a nonwoven industrial fabric for conveying in an industrial process, the method comprising the steps of
  (a) providing a film having an upper surface and a lower surface;
  (b) selectively applying pressure to selected portions of the film to form protruding embossed areas separated by land areas, creating a contoured profile in the upper surface, each protruding embossed area comprising a top member having opposed sidewalls connected to the top member at first and second lateral edges;
  (c) selectively cutting and removing material from at least one of the sidewalls of at least some of the protruding embossed areas to define protrusions each having a body supported by opposed compression resistant first and second end walls and to define at least one apertures extending from the upper surface to the lower surface, wherein each end wall has a base edge connected to an adjacent land area and has a configuration selected from at least one of
    (i) the base edge being convexly curved away from the protrusion body; and
    (ii) each end wall extending below at least a part of each of the first and second lateral edges and being connected to each of the first and second lateral edges;
  (d) preparing a first and a second layer of the film;
  (e) aligning selected protrusions of the first layer with land areas of the second layer, and aligning selected protrusions of the second layer with land areas of the first layer; and
  (f) securing the first layer to the second layer to produce a multilayer fabric.

The invention further seeks to provide a method of constructing a nonwoven industrial fabric for conveying in an industrial process, the method comprising the steps of
  (a) providing a film having an upper surface and a lower surface;
  (b) selectively applying pressure to selected portions of the film to form protruding embossed areas separated by land areas, creating a contoured profile in the upper surface, each protruding embossed area comprising a top member having opposed sidewalls connected to the top member at first and second lateral edges;
  (c) preparing a first and a second layer of the film;
  (d) aligning selected protruded embossed areas of the first layer with land areas of the second layer, and aligning selected protruded embossed areas of the second layer with land areas of the first layer;
  (e) securing the first layer to the second layer; and
  (f) selectively cutting and removing material from at least one of the sidewalls of at least some of the protruding embossed areas to define protrusions each having a body supported by opposed compression resistant first and second end walls and to define at least one aperture extending from the upper surface to the lower surface, wherein each end wall has a base edge connected to an adjacent land area and has a configuration selected from at least one of
    (i) the base edge being convexly curved away from the protrusion body; and
    (ii) each end wall extending below at least a part of each of the first and second lateral edges and being connected to each of the first and second lateral edges.

In the methods of the invention, optionally step (a) further comprises selectively cutting the film to provide a plurality of slits extending from the upper surface through to the lower surface; the land areas in step (b) are provided between adjacent pairs of the slits; and the cutting is performed adjacent to the slits.

Preferably, the top member is substantially planar. Preferably each sidewall is provided with a linear lower edge. Optionally, each base edge is provided with a substantially semicircular configuration. Preferably each protruding embossed area is provided with a lower perimeter comprising a configuration selected from an ellipse, a circle and a rectangle.

Preferably, the methods of the invention further comprise providing to each end of the fabric a pair of opposed seaming elements constructed according to the invention.

In the methods of the invention, the sequence of performing the various steps of slitting, cutting, pressing and embossing, and combining the layers of film can be selected as desired.

In the films, fabrics and methods of the invention, preferably the film comprises a material selected from a thermoplastic polymer, a thermoset polymer and a metal. Where the material is a thermoplastic polymer it is preferably selected from hydrolysis stabilized polyethylene terephthalate (PET), polybutylene terephthalate (PBT), polyethylene naphthalate (PEN), polycyclohexane dimethanol terephthalate (PCTA), polypropylene (PP), a polyamide selected from as PA-6, PA-6/6, PA-6/10 and PA-6/12, polyphenylene sulphide (PPS) and polyether ether ketone (PEEK), preferably polyethylene terephthalate.

Where the material is a thermoset polymer, preferably it comprises a polyimide. Where the material is a metal, preferably it is selected from aluminum and alloys thereof.

DETAILED DESCRIPTION OF THE FIGURES

FIGS. 1 to 4 show a prior art film, and are discussed above.

Figure 1:
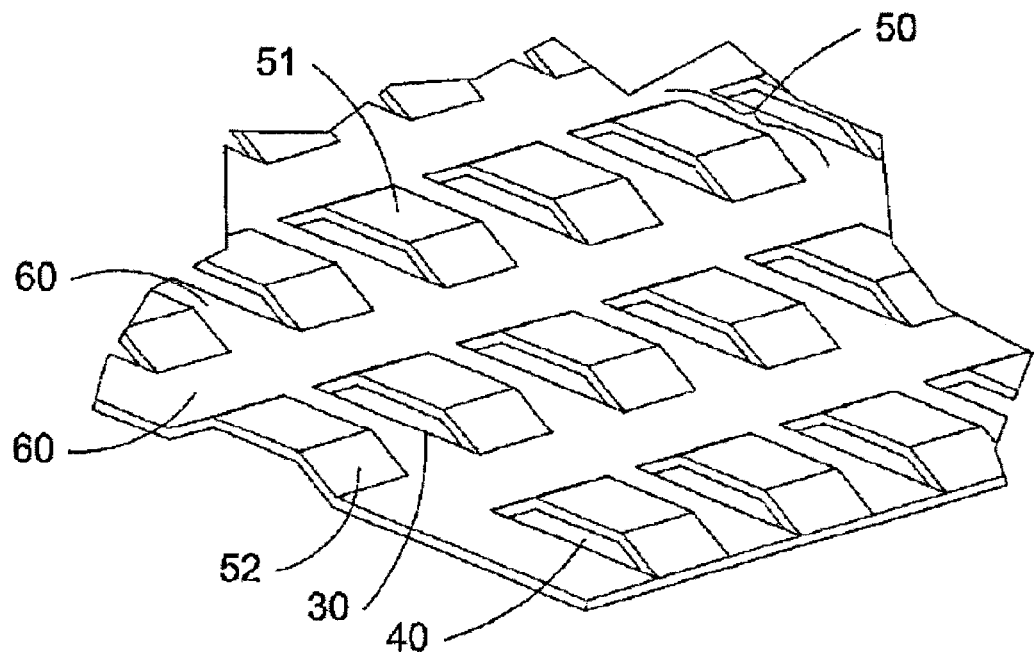
FIG. 1 is an illustration of a prior art profiled and slit film.
Figure 2:
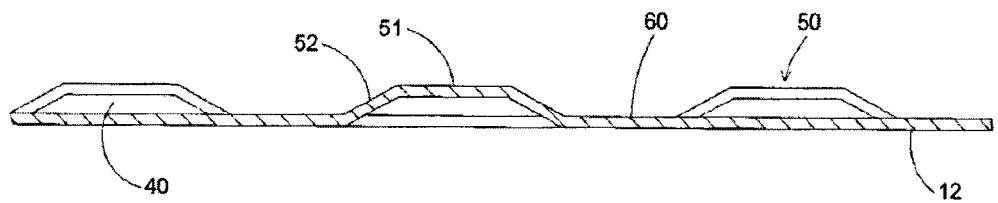
FIG. 2 provides a detailed view of the protrusions 50 in the prior art fabric.
Figure 3:
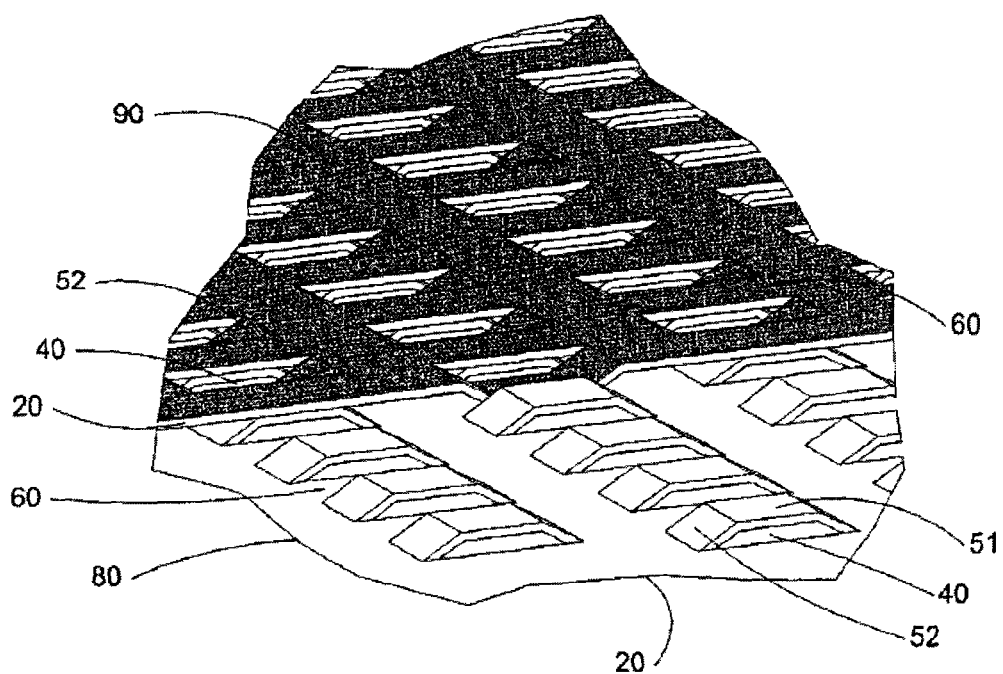
FIG. 3 is a detailed perspective view of a prior art film fabric.
Figure 4:
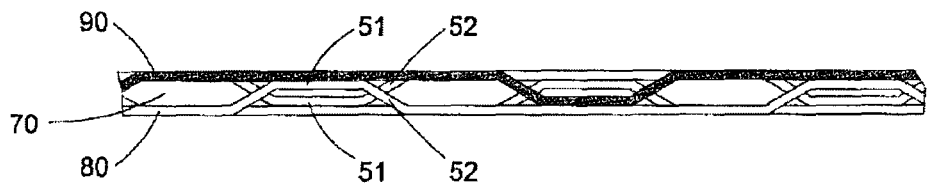
FIG. 4 is a cross-section view of the FIG. 3 structure.
Figure 5:
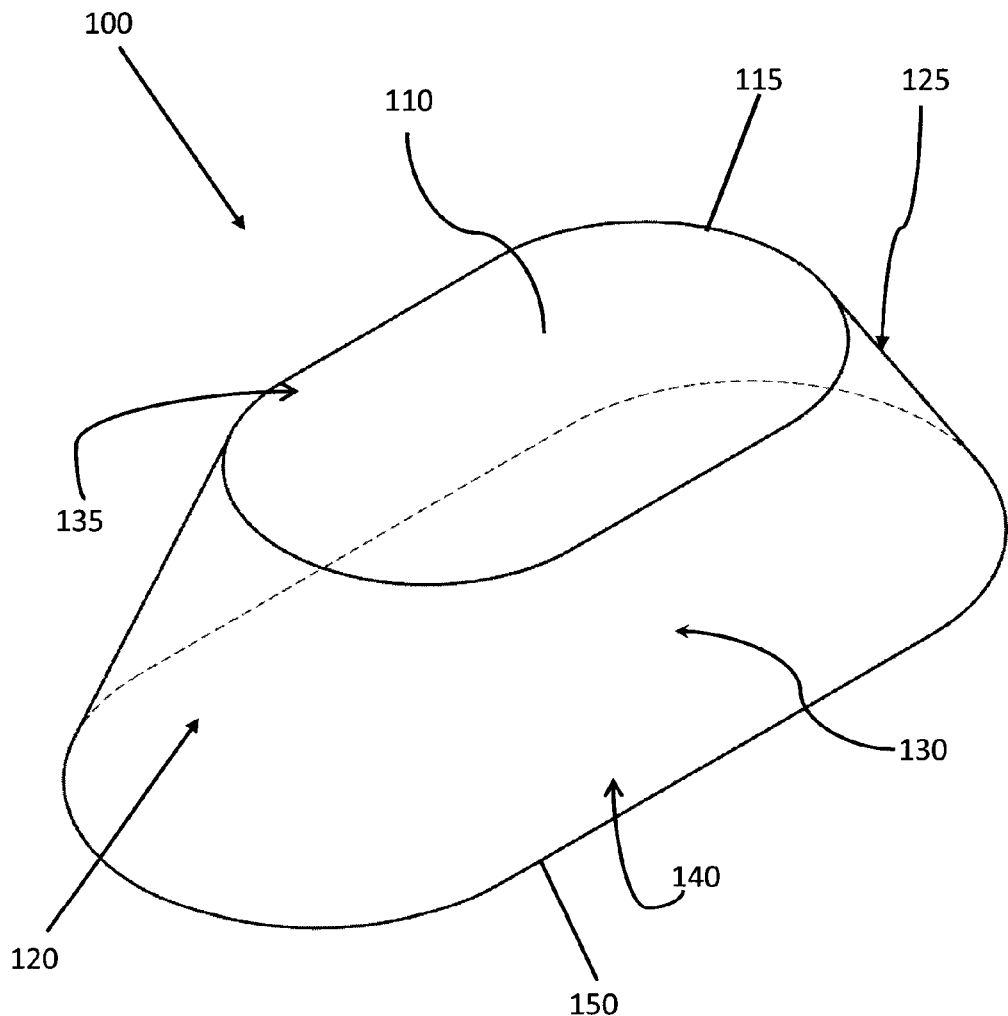
FIG. 5 is a perspective view of a first protrusion shape for use in embodiments of the present invention.

FIG. 5 is an illustration of a first embodiment of a protrusion for the film components and nonwoven fabrics of the invention and which is designed to resist compressive loading in an assembled fabric structure. As shown in FIG. 5, a portion of a generally planar polymeric film having first and second sides and thickness, typically in the range of from about 100 μm to about 500 μm, is permanently deformed in an embossing or similar thermoforming process into an essentially linearly extended frustoconical protrusion 100. A plurality of such protrusions 100, spaced apart from one another according to a chosen pattern, are formed in the film. Each protrusion 100 includes a planar top surface 110 bounded by upper edge 115, rounded forward wall 120, rounded rearward wall 125, first side wall 130, and second side wall 135. Because the protrusion 100 is molded from a planar film, edge 150 is formed around the interior circumference of the base of protrusion 100 where material inside this edge is deformed out of plane forming a depression at base region 140 on the second side of the film. As explained below, this depression will become an aperture that is open to the exterior following a slitting process to remove some of the material from each of the side walls 130 and 135.

In the exemplary embodiment shown in FIG. 5, protrusion 100 has an overall length in the longitudinal direction along its base region 140 of 5 mm from the outer extremities of its forward wall 120 to its rearward wall 125, and a width of 2.5 mm from side wall 130 to side wall 135. Both forward wall 120 and rearward wall 125 are curved in relation to side walls 130 and 135; the radius of curvature is 1.25 mm; side walls 130 and 135 each have a length of 2.5 mm and are linear between the forward and rearward walls. Both forward and rearward walls 120 and 125, and the side walls 130 and 135, are canted inwards so the protrusion 100 is generally frustoconical in shape and the area of the base (as defined by edge 150) is greater than the area of top surface 110. Side walls 130 and 135 are canted inwards at an angle of from about 3° to about 5° to the vertical. The height of protrusion 100 from film layer 200 (see FIG. 6) to the planar top surface 110 is 1.5 mm. These dimensions are merely exemplary; it is within the scope of the invention to adjust these various dimensions according to the intended end use of the film. The permeability of protrusion 100, and thus of the film fabric, will be determined by the amount of material removed from the side walls 130 and 135 by slitting, as will be discussed below.

It will be appreciated that the overall shape of protrusion 100 and, in particular, its forward and rearward walls 120 and 125, imparts significant rigidity to the protrusion thereby increasing its ability to resist compressive forces applied normal to surface 110 in comparison to the prior art protrusions such as are shown in FIGS. 1 to 4. This is due to the increased bending stiffness imparted to the structure by the curved forward and rearward walls 120 and 125. The curvature of these walls allows them to support much greater loads without buckling than the flat surfaces of the prior art constructions. As is the case with arches in structural engineering applications, the bending stiffness of these curved walls will be proportional to the cube of their depth from their neutral line. For example, if the curved walls 120 and 125 of the protrusion 100 were replaced with walls having a more parabolic curvature (i.e. their curvature was sharper, their radius of curvature smaller, and their depth thus greater), then their bending stiffness would be increased. Similarly, if the walls are made shallower and more plate-like, they lose stiffness in comparison to those which have a sharper curve.

Thus in a first embodiment of the invention, the forward and rearward walls of the protrusions should be curved according to a selected radius of curvature r; the smaller the value of r, then the greater the curvature of these walls and thus the greater their bending stiffness. Preferably, the forward and rearward walls 120 and 125 will each have the same radius of curvature, and will each be sloped towards planar top surface 110 by the same angle, but this is not necessary and the slope of each wall 120 and 125 may be different one from the other. The curvature of these end walls may approximate shells of revolution such as, for example, of a parabola. Essentially, any shape of shell that is inscribed by a curve rotated around a Z-axis (relative to the plane of the film) will act to increase the support strength of the walls; therefore, many suitable shapes exist. The side edge 115 of the planar top surface 110 and edge 150 of the base region 140 may be provided with a small radius of curvature so as to ease the removal of protrusion 100 from a mold such as would be used in a thermoforming process.

FIGS. 6 to 16 illustrate various details and features of a film using the shape and dimensions of the protrusion 100 shown in FIG. 5, and an industrial film fabric made of two such layers which have been joined together in the manner described in the '259 document.

Figure 6:
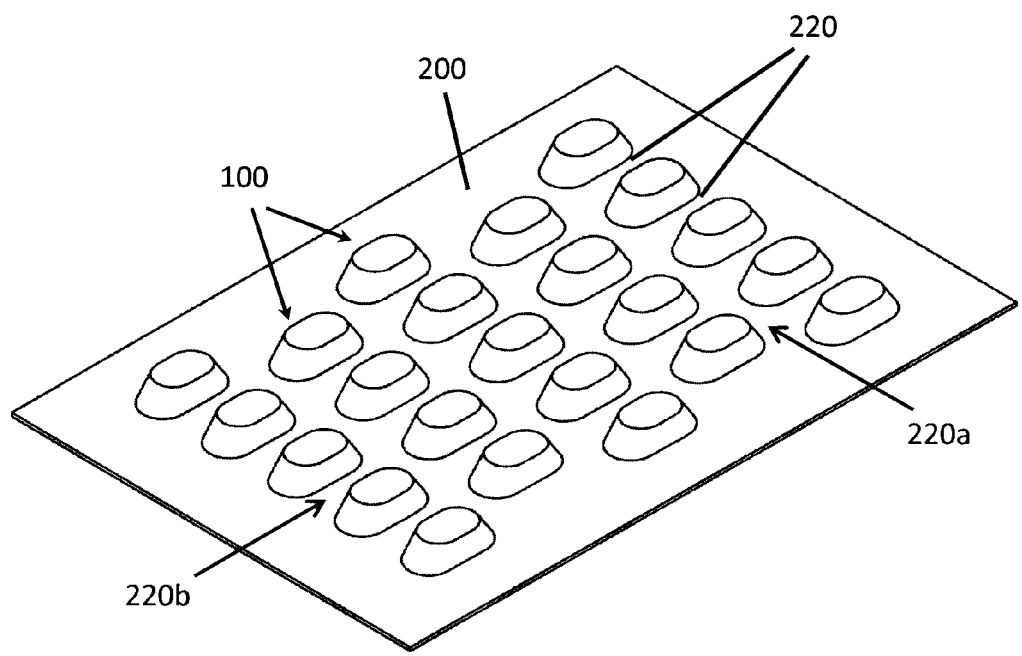
FIG. 6 is a perspective view of a portion of a film layer in an embodiment of the invention, including a plurality of protrusions such as are shown in FIG. 5.

FIG. 6 shows a small portion of a planar sheet film 200 which has been molded in a thermoforming process to form a plurality of frustoconical protrusions 100 such as shown in FIG. 5, each separated one from the other by land areas 220. The protrusions 100 are aligned so as to leave lanes 220a open to form the eventual channels 230 in the assembled film fabric (see FIGS. 11 and 12). To form the film fabrics of the present invention, the film layer 200 would be slit and then joined to a second similarly slit and profiled layer such that the planar top surfaces 110 of the protrusions 100 of the first layer are located on and in contact with a portion of the land areas 220 of a second similarly profiled film layer, in the manner shown in FIGS. 7 to 13.

Figure 7:
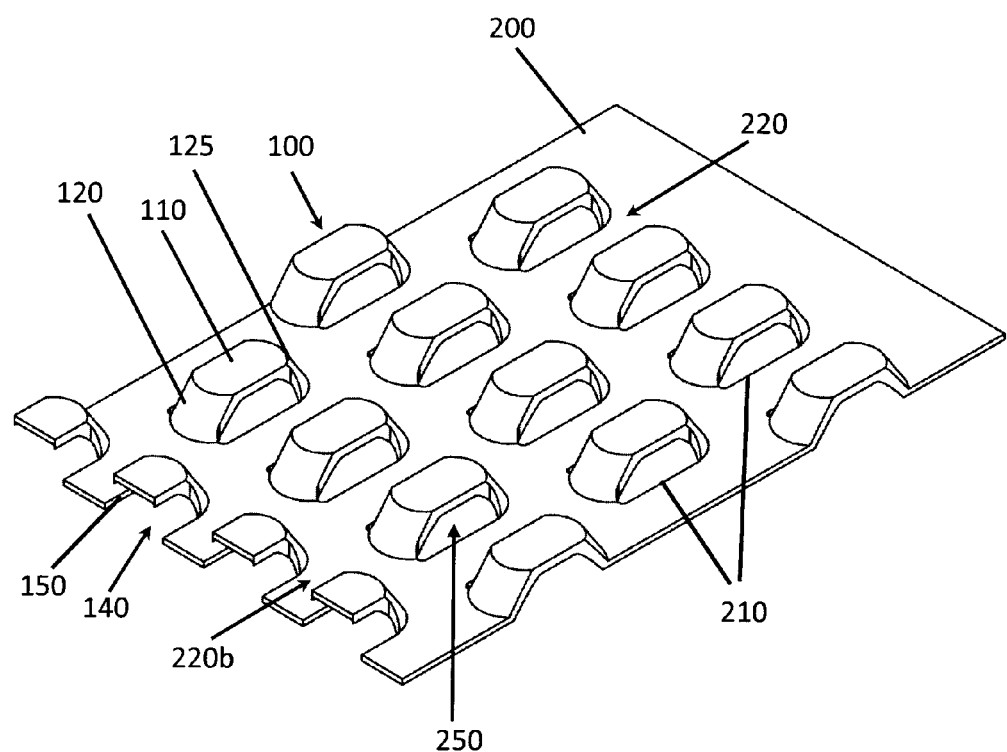
FIG. 7 is a detailed perspective view of the film shown in FIG. 6 following a slitting process.

FIG. 7 is a perspective view of a cut-away portion of the molded film layer 200 shown in FIG. 6 and including three and one half rows of protrusions 100 shaped identically to that shown in FIG. 5; the film 200 and protrusions 100 have been slit in the manner described above so as to remove a majority of the side wall material from side walls 130 and 135 (see FIG. 5) and between forward walls 120 and rearward walls 125, thus creating apertures 250, the material being removed by the slitting process which formed slits 210 in the film 200. The length of the slits 210 relative to the size of the protrusions 100, and thus the amount of side wall material removed from walls 130 and 135, can be adjusted to affect different fabric properties, particularly permeability, as will be discussed below. Following slitting, the protrusion base region 140 having edge 150 is open to the opposite surface of the film via apertures 250. The planar top surface 110 of each protrusion is supported entirely by the forward and rearward walls 120 and 125 as discussed in relation to FIG. 5.

Between each protrusion 100 there is located a land area 220. This film was created by first embossing a flat and planar sheet of polymeric film 200 to provide a plurality of regularly arranged protrusions 100 such as are shown in FIGS. 5 and 6. The protrusions are located such that there is sufficient space on land areas 220b between them in a row to accept a set of planar protrusion top surfaces 110 from a corresponding row in a second, similarly profiled film layer. This spacing allows the two identical film layers to be mated, such that the protrusions on a first embossed film can fit into the land areas of a second similar film, and vice versa (see FIGS. 11, 12 and 13). Once the film 200 is molded to include protrusions 100, it is precision slit by either mechanical or ablative means along a portion of edge 150 of base region 140 which also removes a portion of the material forming the side walls 130 and 135; a laser is preferred for this purpose. This opens the protrusions 100 at their side walls 130, 135 to the base region 140 and forms apertures 250 to allow through passage of fluids such as air through base region 140. It will be appreciated that the size of the apertures 250 is selectable in relation to the amount of film material removed from each of the side walls 130 and 135; the amount removed will be based on parameters such as intended end use of the film fabric.

Figure 8:
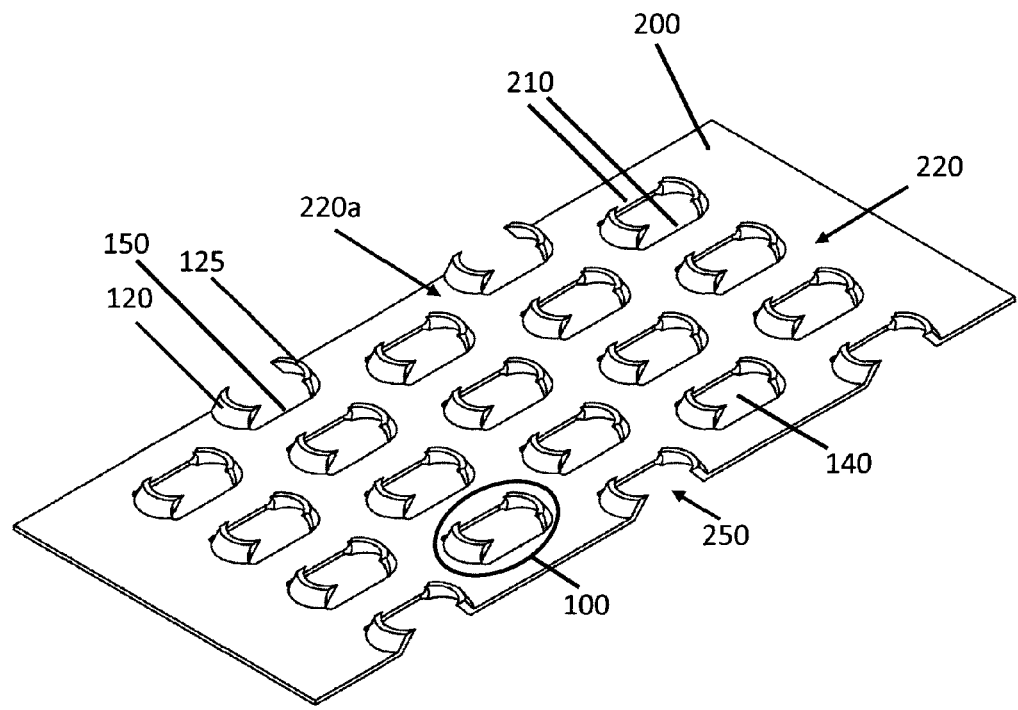
FIG. 8 is a cut-away perspective view of the film of FIG. 7.

FIG. 8 is a cut-away perspective view of the profiled and slit film 200 shown in FIG. 7; in this view, a horizontal section oriented parallel to the planar sheet 200 has been taken through walls 120 and 125 of protrusions 100 at a small distance above their base regions 140, to show more clearly the apertures 250 in the film layer 200; prior to the slitting of side walls 130 and 135, the base regions 140 were closed depressions when viewed from the opposite side of the profiled film. The length of slits 210 will determine how much material is removed from each of the side walls 130, 135, and thus the openness or permeability of the film. The protrusions 100 are regularly arranged and land areas 220 provide lanes 220a between adjacent rows of protrusions 100, to form the eventual channels 230 in the assembled film fabric (see FIG. 12). The interior of each protrusion 100 is bounded by an edge 150 from which rise compression resistant forward and rearward walls 120 and 125.

Figure 9:
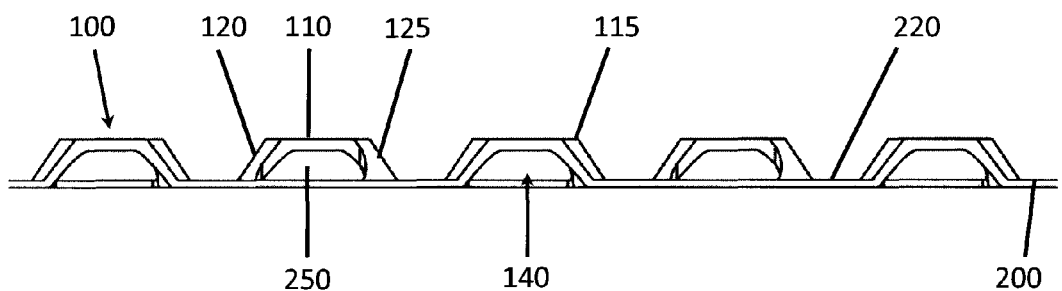
FIG. 9 is a cross-section through five protrusions such as are shown in FIG. 7.

FIG. 9 is a cross-section taken through a profiled and slit film 200 according to the invention along and parallel to the exposed edge of the film in FIG. 7 and showing five protrusions 100 in film layer 200. Each protrusion 100 includes a forward wall 120, a rearward wall 125, a flat protrusion top surface 110 with edge 115 and apertures 250 through side walls 130 and 135 (see FIG. 5), allowing passage of fluid through the film via open base region 140. The buttressing shape of the forward and rearward walls 120 and 125 can be clearly seen in this cross-section. As is more clearly shown in FIG. 10, each slit 210 extends the length of the side walls 130 and 135 (shown in FIG. 5) and into both the forward and rearward walls 120 and 125 so that the majority of the side wall material has been removed by slitting, and the size of apertures 250 is maximized. The length of the slits 210 can be increased or decreased depending on need, thus allowing for changes to the size of the resulting apertures 250.

Figure 10:
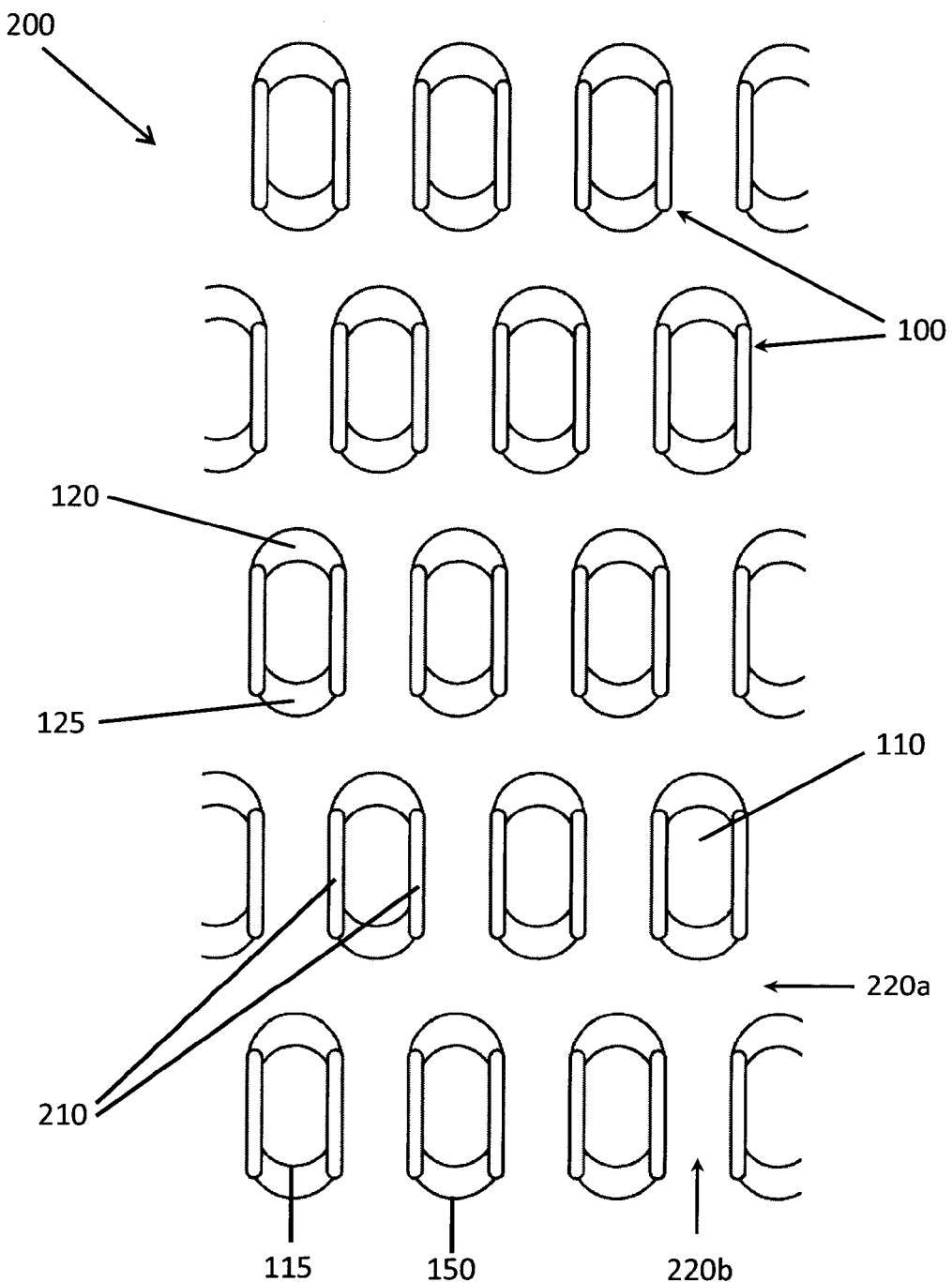
FIG. 10 is a plan view of multiple protrusions in a film layer such as shown in FIG. 7.

FIG. 10 is a plan view of fifteen full and five partial protrusions 100 in a film sheet 200 such as is shown in FIGS. 6 to 9. Each protrusion 100 is separated from an adjacent protrusion in the same row by land areas 220b which provide receiving areas to accept planar protrusion top surfaces 110 of a set of a corresponding, similarly profiled film layer; each row of protrusions 100 is separated from the next by a cross direction (CD) lane 220a which, when the first layer is assembled with the second similarly profiled film layer, will form open channels across each lane (see FIGS. 11 and 12). Each protrusion 100 has a generally planar top surface 110 bounded by edge 115, forward and rearward walls 120 and 125, and base region 140 (see FIG. 8) bounded by edge 150. Slits 210 are positioned on either side of protrusions 100 where side walls 130 and 135 (see FIG. 5) were removed during the slitting process. Compressive support for the top surfaces 110 of protrusions 100 is thus provided by forward and rearward walls 120 and 125. The size of slits 210 can be selected so as to remove a desired portion of the material comprising side walls 130, 135 so that the openness or permeability of the profiled film can be selectable according to need. It is to be understood that, in order to retain the buttressing effect provided by forward and rearward end walls 120, 125 (and thus the overall compression resistance of the assembled fabric structure), care should be taken so as to not remove any significant portions of these walls.

Figure 11:
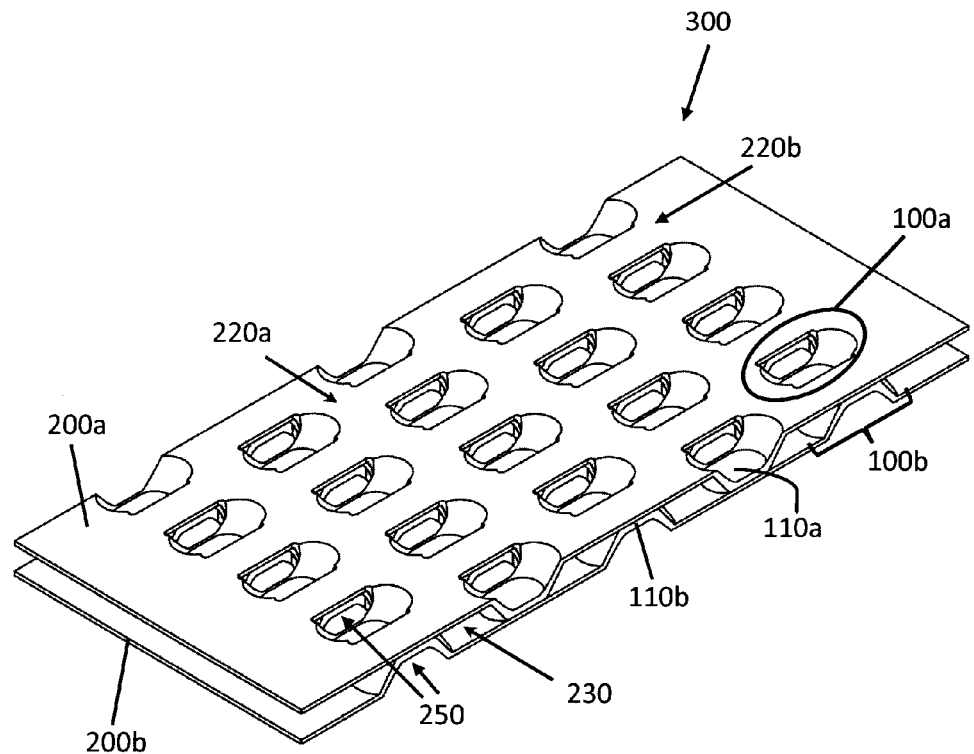
FIG. 11 is a partial perspective view of a two layer film fabric in an embodiment of the invention.

FIG. 11 is a perspective view of two film layers 200a and 200b which have been slit and profiled in the manner described above, to provide apertures 250, and have been located in preparation for them to be joined together to form an assembled film fabric 300 by means of a laser welding or similar bonding process. It is apparent that, in this assembly, the protrusions 100b from layer 200b are located between protrusions 100a of layer 200a so that lanes 220a of each layer 200a, 200b are aligned with one another to form channels 230 in the assembled fabric 300. A typical protrusion 100a is identified by the elliptical marking on FIG. 11; planar top surfaces 110a, 110b are in contact with land areas 220b on the respective opposing layer. Channels 230 are oriented parallel to one another in a transverse direction to the longitudinal direction of the film layers as illustrated. It can also be seen that each aperture 250 of each protrusion such as 100a is aligned with that adjacent to it from the second layer with which it is mated such as 100b and thus provides for flow-through diagonal passageways which are open through the two film layers 200a, 200b.

Figure 12:
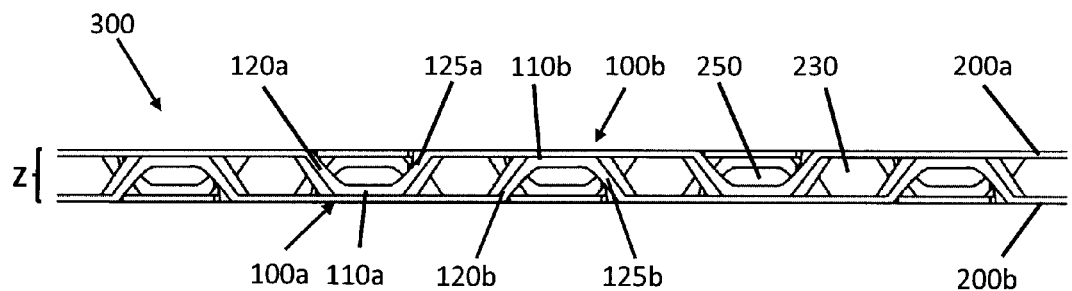
FIG. 12 is a cross-section taken through the film fabric shown in FIG. 11.

FIG. 12 is a cross-sectional view taken through the film layers of assembled fabric 300 shown in FIG. 11 along the exposed cut edge at the right of the figure. Both layers 200a and 200b are profiled in the identical manner, allowing protrusions 100a of layer 200a to be located on corresponding land areas 220b (see FIG. 11) on layer 200b. As shown, the planar top surfaces 110a of each protrusion 100a of film layer 200a are located in contact with planar land areas 220b of film layer 200b along the rows of protrusions 100b such that each protrusion 100a is nested between corresponding protrusions 100b from layer 200b and each is supported by forward walls 120a and rearward walls 125a; similarly, planar top surfaces 110b of each protrusion 100b are located in contact with film layer 200a along the same rows. Thus it can be seen that the forward and rearward walls 120, 125 of each protrusion 100 from each layer 200a and 200b serve to support and maintain a vertical distance Z between the two film layers 200a, 200b. Also as shown, protrusions 100a, 100b are constructed and arranged so that apertures 250 and channels 230 are both open and free of obstruction across the width of the assembled film fabric in the CD. It will be apparent from this that the permeability to fluids such as air and water of the assembled film structure 300 can be adjusted by adjusting the size of the apertures 250 which are, in turn, adjusted by increasing or decreasing the length of the slits 210, or their shape (as will be discussed in greater detail below in relation to FIGS. 28 and 29).

Figure 13:
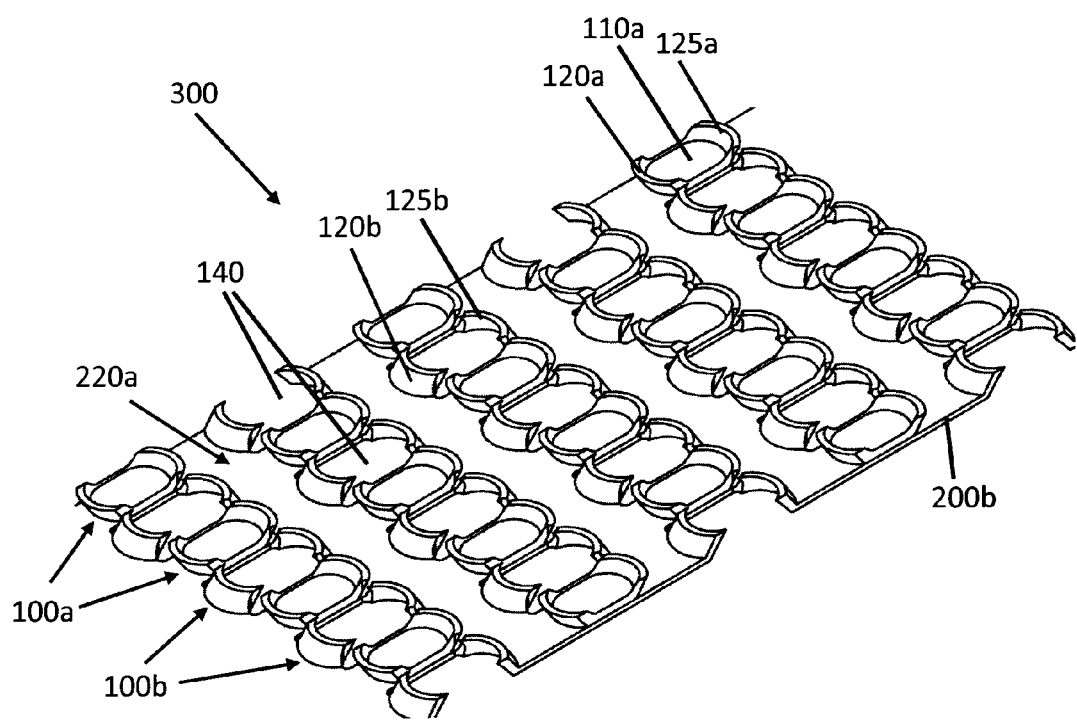
FIG. 13 is a cut-away perspective view of the film fabric shown in FIGS. 11 and 12.

FIG. 13 is a cut-away perspective view showing the alignment of protrusions 100a and 100b in the assembly of two film layers 200a (not seen) and 200b to be bonded together. Side walls 120a, 125a, 120b, 125b are shown partially cut-away. Planar top surfaces 110a of protrusions 100a are located between base regions 140 on layer 200b, providing CD lanes 220a between each row of protrusions; these lanes will become channels 230 in the assembled fabric.

Figure 14:
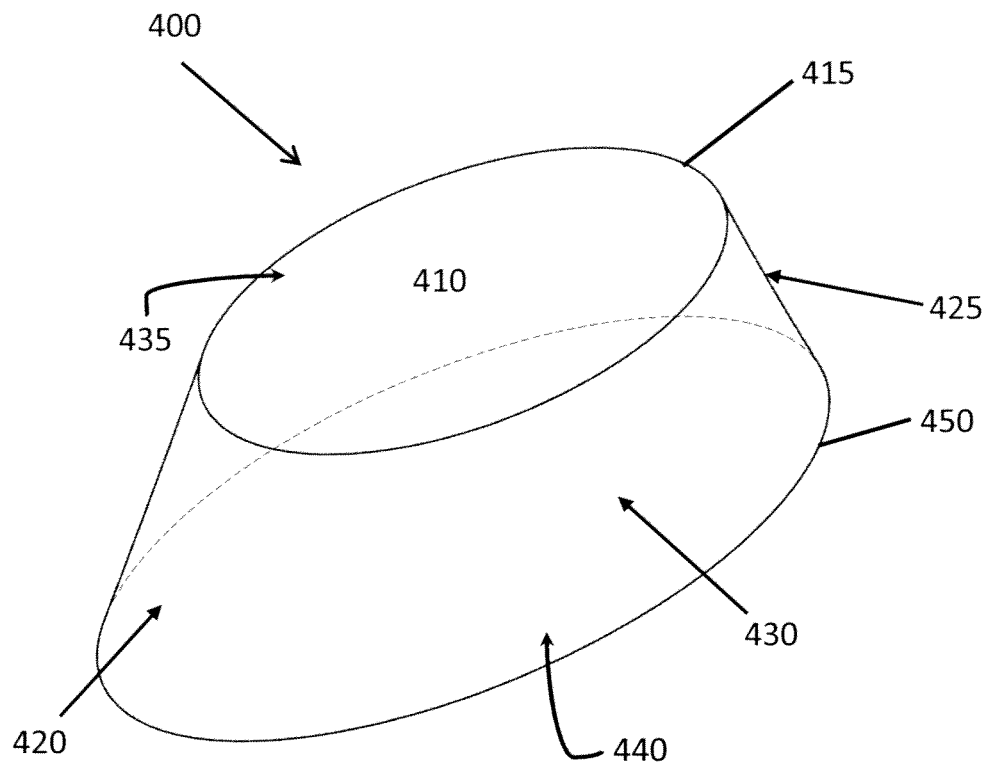
FIG. 14 is a perspective view of an alternative configuration of a protrusion for use in embodiments of the invention.

FIG. 14 shows an alternate embodiment of the protrusions intended for use in the profiled films and film fabrics of the present invention. In this embodiment, the edge 450 of the base region 440 of the frustoconical protrusion 400 is elliptical and the side walls 430 and 435, analogous to walls 130 and 135 of FIG. 5, are rounded rather than linear in comparison to those shown in FIGS. 5 to 13. Protrusion 400 further includes generally planar top surface 410 bounded by upper edge 415 and supported by forward wall 420 and rearward wall 425; because protrusion 400 is molded from a planar film, edge 450 is formed around the interior circumference of depression at base region 440 where the film was deformed out of plane on the second side of the film. As explained further below, and as has been described in relation to the embodiment presented in FIGS. 5 to 13, this base region 440 will become part of an aperture in the protrusion 400 that is open to the exterior following a slitting process to remove some of the material from the side walls 430 and 435.

Figure 15:
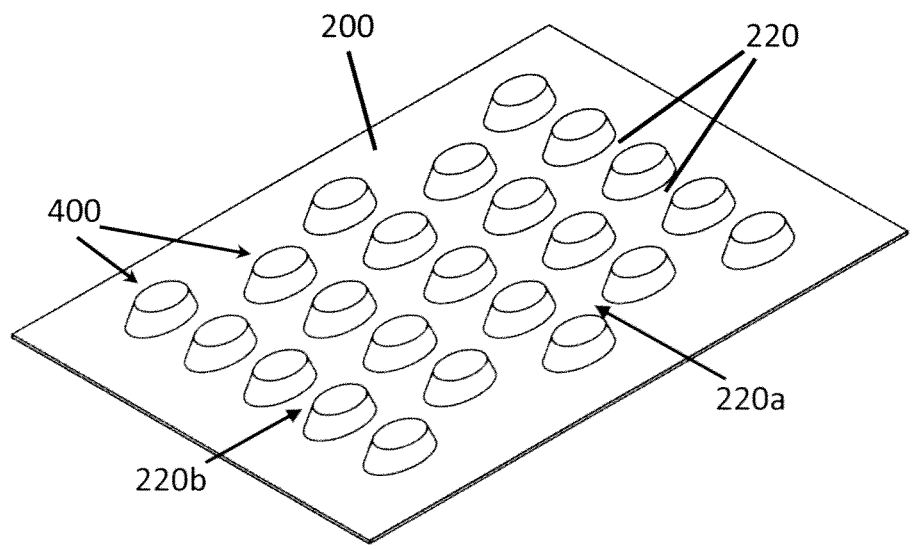
FIG. 15 is a perspective view of a portion of film layer in an embodiment of the invention, including a plurality of protrusions such as are shown in FIG. 14.

FIG. 15 is a perspective view of a film layer 200 which has been molded in a thermoforming process to form a plurality of protrusions 400 such as are shown in FIG. 14. As shown, protrusions 400 are regularly arranged with each separated one from the other by land areas 220. The protrusions 400 are arranged in parallel rows; each row is separated from the next by a lane 220a, and each protrusion 400 is separated from adjacent protrusions in the same row by land areas 220b. Land areas 220b are dimensioned so as to be capable of receiving planar top surfaces 410 from a second, similarly profiled film layer such that these top surfaces rest in contact with land areas 220b.

Figure 16:
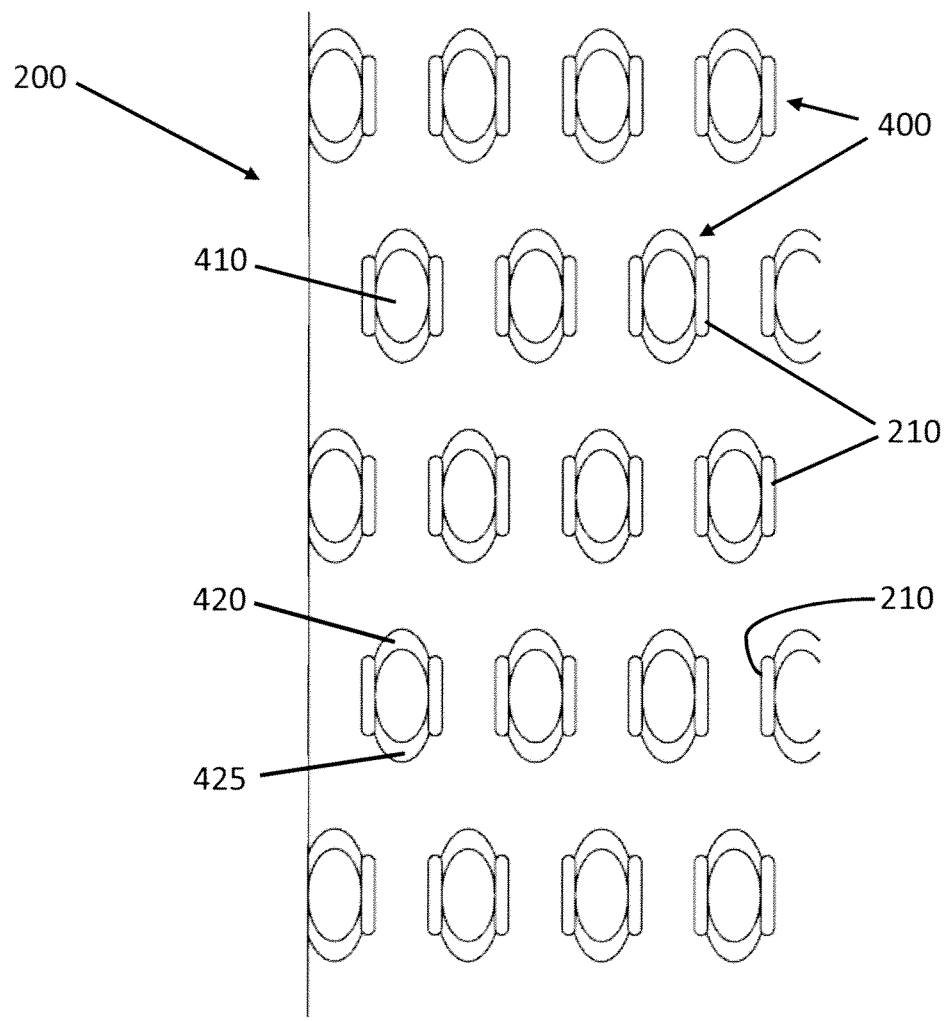
FIG. 16 is a plan view of the film shown in FIG. 15 following a slitting process to remove a portion of the side wall material.

FIG. 16 is a plan view of a slit film including a plurality of protrusions 400 shaped and arranged as shown in FIGS. 14 and 15. In the molded film shown in FIG. 16, a plurality of parallel slits 210 have been cut adjacent both of the side walls 430, 435 (see FIG. 14) of each protrusion 400 and extending from the forward wall 420 to the rearward wall 425 of each protrusion so as to remove a portion of the side walls 430, 435. The slits 210 are precision cut using a laser or similar cutting means so as to remove a desired portion of the material forming side walls 430, 435 and thus provide openings directly through the film via the base regions 440. It will be apparent that adjustments in permeability can be made in the film by changing the length of the these slits 210 so as either to remove more or less of the side wall 430, 435 material, or to create longer slits in the film, or both. FIG. 16 also shows the regular arrangement of the protrusions 400 as discussed above.

Figure 17:
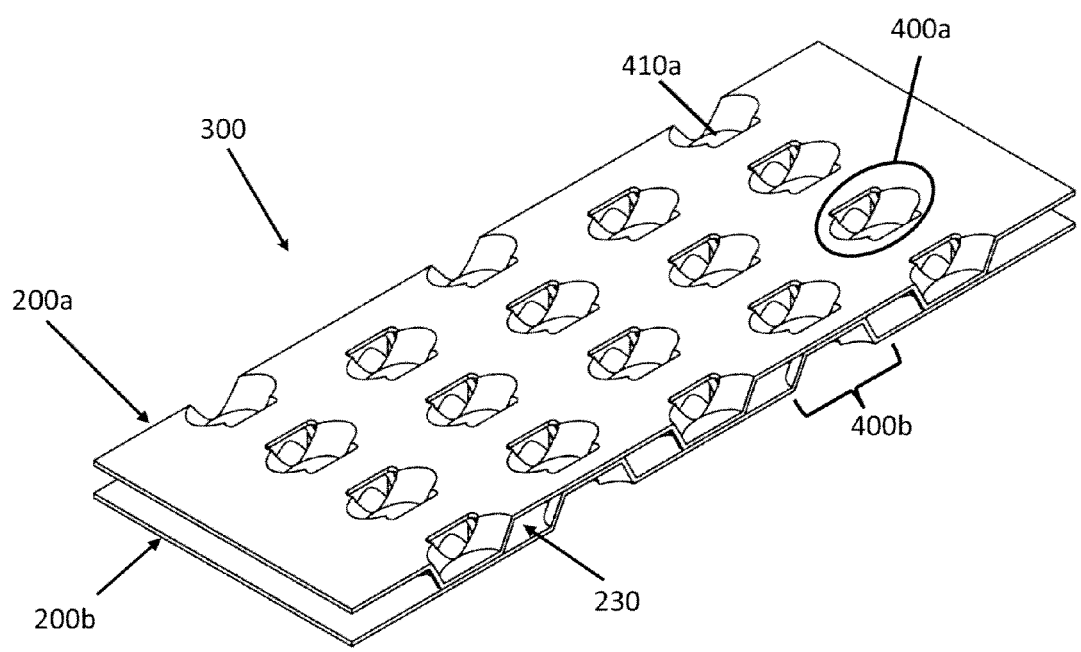
FIG. 17 is a perspective view of a film fabric assembled from two layers of the slit and profiled film shown in FIG. 16.
Figure 18:
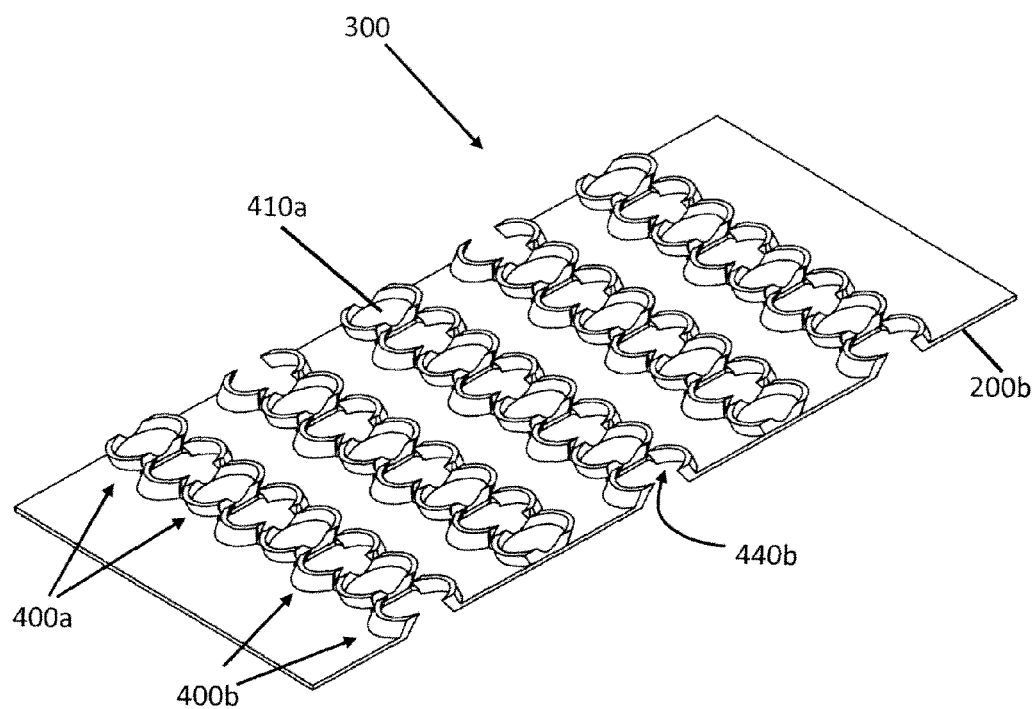
FIG. 18 is a cut-away perspective view of the film fabric shown in FIG. 17.

Referring now to FIGS. 17 and 18, FIG. 17 is a perspective view of an assembled film fabric 300 including two layers 200a and 200b of similarly molded and slit film such as shown in FIGS. 14 to 16 laid over one another in preparation for bonding so as to permanently join the layers together into a unified structure suitable for eventual use in an industrial textile. The appearance and position of the protrusions 400a and 400b from each of the two layers relative to one another is shown in the cut-away view through the fabric 300 and parallel to the film layers 200a and 200b in FIG. 18, which also shows the location of the planar top surfaces 410a relative to the base regions 440b so as to form channels 230.

It will be apparent from the foregoing that the shape of the protrusions and their base regions can be modified as required, from that of an elongated frustoconical such as shown in FIGS. 5 to 13, to an elliptical frustoconical as shown in FIGS. 14 to 218, to a circle or other desired shape in which at least the end walls are shell shaped. Although shell structures provide a simple and effective means of imparting compression resistance to the protrusions and thus to the assembled two layer films to which they are provided in the manner herein described, it has also been found that other structural solutions are available which deliver similar results. Several alternative embodiments are discussed below in relation to alternate protrusion structures which offer a measure of compression resistance.

Figure 19:
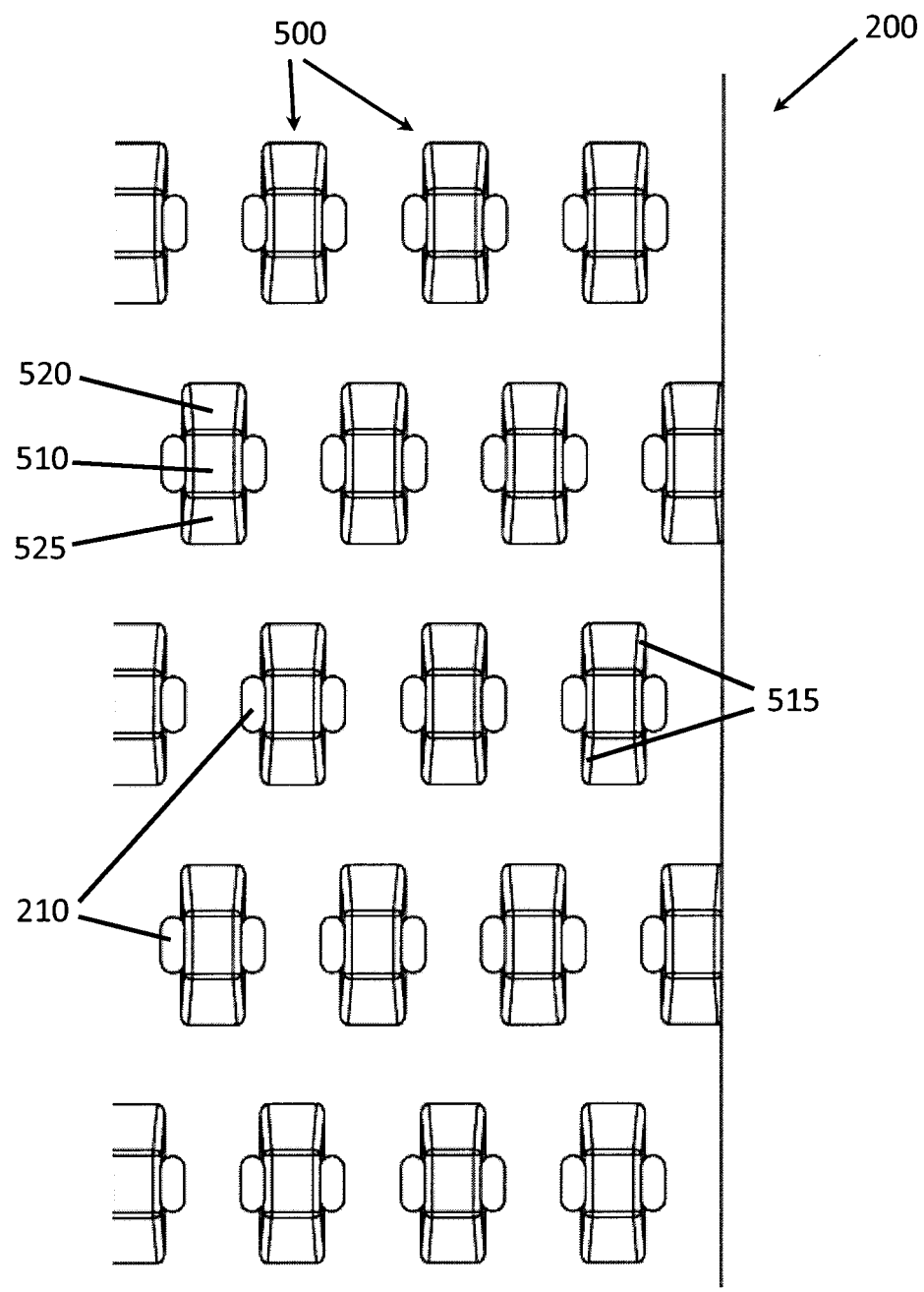
FIG. 19 is a plan view of a portion of a slit and profiled film layer shaped according to an embodiment of the invention.

FIGS. 19 to 25 illustrate two further embodiments of the invention. FIG. 19 is a plan view of a slit and profiled film similar to that shown in the prior art FIGS. 1 to 4. As previously discussed in relation to those figures, the upper surfaces 51 of protrusion 50 are supported solely by their angled sides 52, and may thus have less resistance under excess load, the compression resistance of the prior art protrusions 50 (and thus the fabric) being limited by the force which the protrusion sides 52 can support before buckling and collapse. To prevent this collapse, the invention allows for the prior art fabric to be modified as follows.

Figure 20:
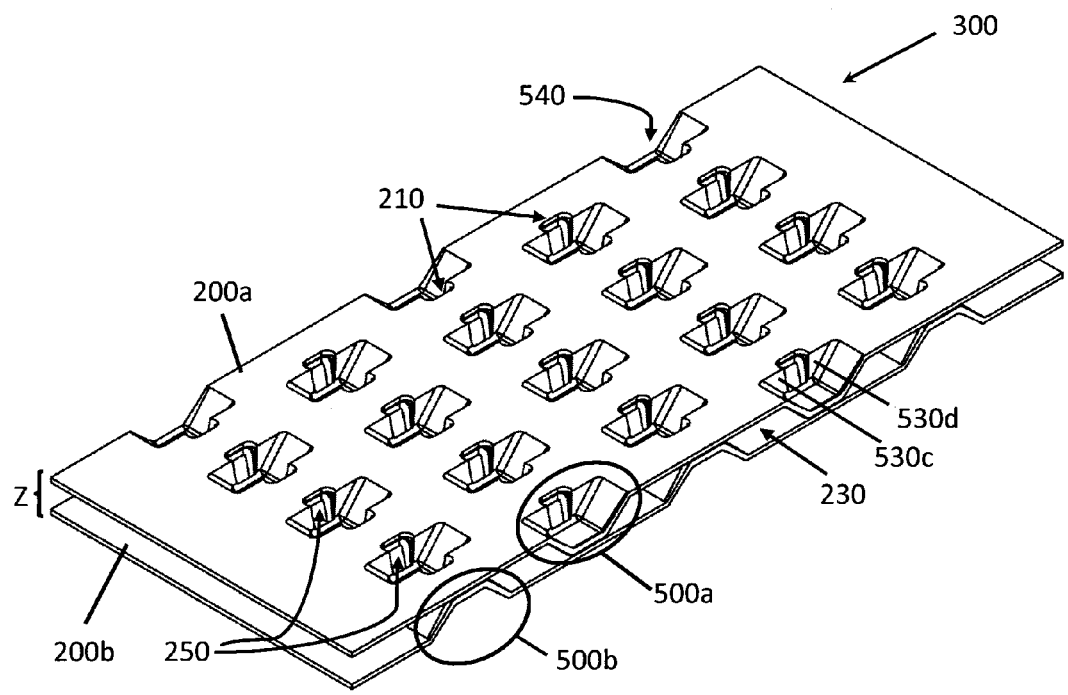
FIG. 20 is a perspective view of a portion of a film fabric according to the invention that is assembled from two similarly profiled layers of film including the protrusions shown in FIG. 19.
Figure 21:
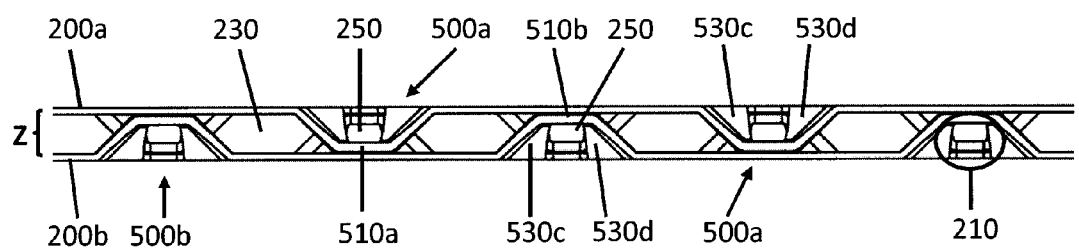
FIG. 21 is a cross-sectional view taken through the film fabric shown in FIG. 20.

Referring to FIGS. 19 to 21, as shown in plan view in FIG. 19, and in perspective in FIG. 20 and cross-section in FIG.

21, the length of slits 210 is equal to the length of the lateral edges 515 of the planar upper surfaces 510 of the protrusions 500, such that reinforcing material 530c, 530d remains under each of the angled planar forward and rearward walls 520 and 525. Inspection of the cross-section shown in FIG. 21 shows that reinforcing material 530c and 530d remains following the slitting process to buttress the walls 520 and 525 and thus maintain the fabric thickness Z when it is exposed to repetitive compressive loading. It is also apparent that the slit size can be extended outwardly away from the protrusion to increase its size. An exemplary pair of protrusions 500a, 500b is shown in FIG. 20. The alignment of the protrusions and their rows is as in the embodiments discussed above, so that apertures 250 are connected to base regions 540; and channels 230 are provided between rows of protrusions 500a, 500b.

Figure 22:
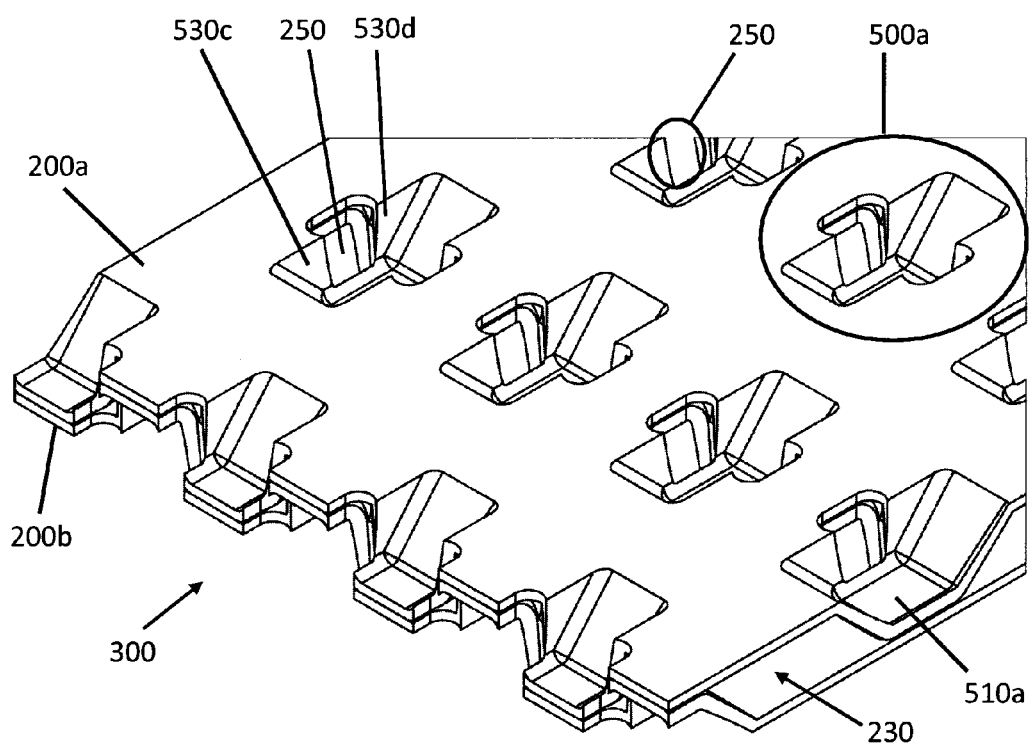
FIG. 22 is a detailed perspective view of a portion of the fabric shown in FIGS. 20 and 21.

FIG. 22 is a detailed perspective view of the assembled film fabric shown in FIGS. 19 to 21; in this view, an additional feature of the slitting effect as utilized in the film fabrics of the invention becomes apparent. In prior art fabrics comprised of a film or a similar solid and essentially planar sheet of material, porosity (or permeability) could be provided by drilling a plurality of holes through the film. To increase porosity from a first to a second higher level, it was necessary to drill more holes per unit area or increase their size. The present construction now provides an effective method of increasing permeability by increasing or decreasing the size of the aperture 250 formed in the protrusion side wall which has a depth in a direction perpendicular to the plane of the film. As is most clearly shown in FIG. 22, as well as in FIGS. 23 to 25, the apertures 250 have a Z-dimension depth component as a result of cutting through the side walls of the protrusion. Thus, a small perforation as seen in plan view can provide a comparatively large channel or passageway for fluid movement. Because the apertures 250 have both a vertical and horizontal component, small changes in the side/diameter of the hole can make a dramatic difference in permeability. The thickness Z of the film fabrics of the invention can thus be utilized to make such adjustments without the need for providing additional apertures.

Figure 23:
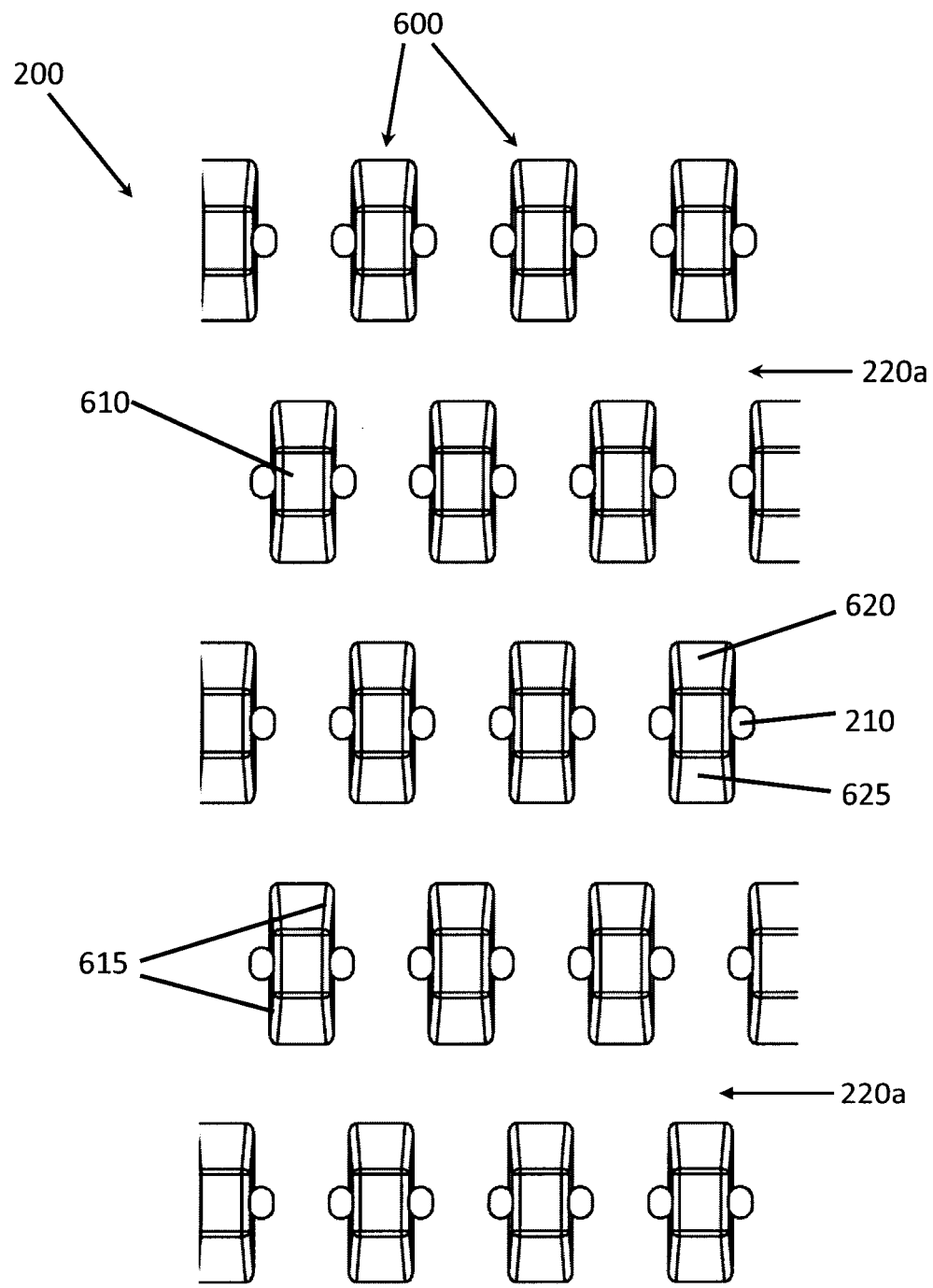
FIG. 23 is a plan view of a slit and profiled film in a further embodiment of the invention.
Figure 24:
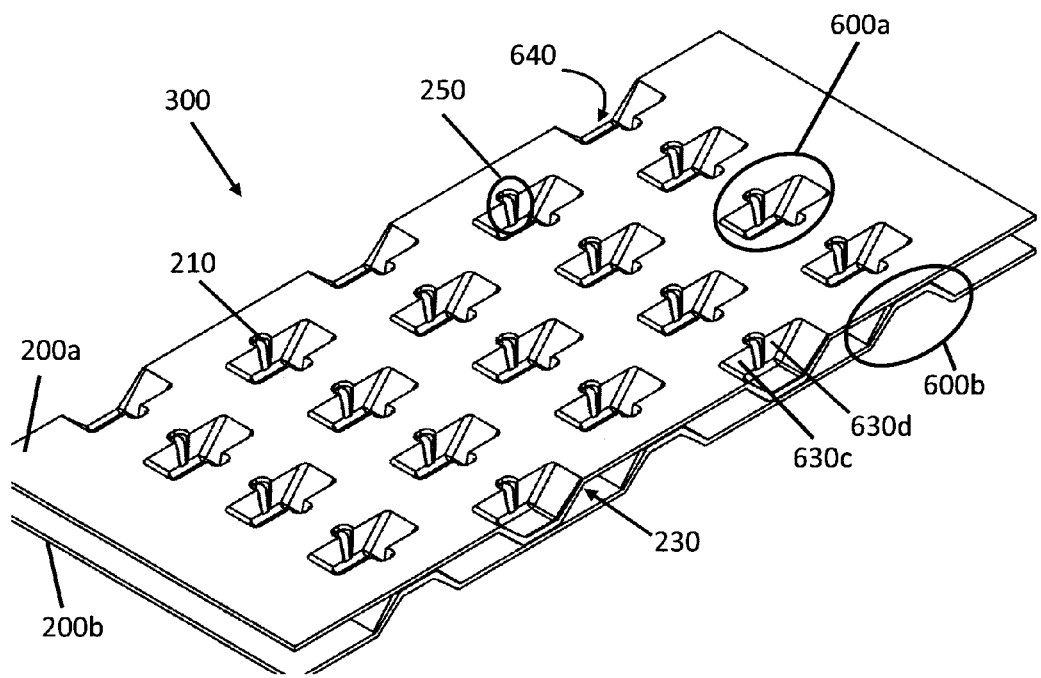
FIG. 24 is a perspective view of the film fabric shown in FIG. 23.
Figure 25:
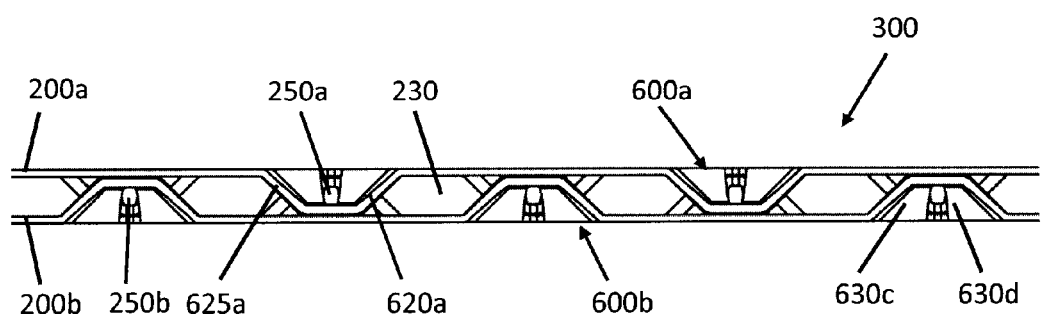
FIG. 25 is a cross-sectional view of the fabric shown in FIG. 24.

As is apparent from the plan view of profiled film 200 shown in FIG. 23, the size of the slits 210 can be shortened in the longitudinal direction (as shown) in comparison to those provided, for example, to the protrusions 500 in FIGS. 19 to 22. Their size may also be increased outwardly away from the protrusion (i.e. in the transverse direction) as well if desired. In FIGS. 23 to 25, each protrusion 600 includes planar forward wall 620 and rearward wall 625 in part supporting planar top surfaces 610. The length of slits 210 is less than the length of the lateral edges 615 of the planar upper surfaces 610 of the protrusions 600, such that reinforcing material 630c, 630d remains under each of the angled planar forward and rearward walls 620 and 625. As in the embodiment presented in FIGS. 19 to 22, walls 620 and 625 are thus further reinforced by side wall reinforcing material 630c and 630d (FIGS. 24 and 25) which formed the side walls of each aperture 600 prior to slitting to remove a portion of these walls to form apertures 250. Inspection of FIGS. 23 to 25 in comparison to similar FIGS. 19 to 21 shows that aperture size 250 in planar protrusions such as 500 and 600 can be adjusted according to need without sacrificing compression resistance as long as a portion of side wall material such as 530c, 530d and 630c, 630d is retained in the protrusion. It will also be appreciated that the assembled fabrics shown in FIGS. 24 and 25 thus have a lower air permeability than the fabrics shown in FIGS. 20 to 22 due to the size of the slits 210 and corresponding apertures 250 in the film fabric. Note also the support benefit provided by reinforcing material 630c and 630d; in instances where increased resistance to compression is needed, forming the apertures 250 outwardly from the protrusions 600 in the manner shown in FIG. 23 leaves additional film material such as at 630c and 630d to help buttress the protrusion 600 and prevent collapse under load.

FIGS. 26 to 29 illustrate a construction suitable for use as either a compression resistant film for use in fabrics of the invention or for seaming the fabrics of the invention.

Figure 26:
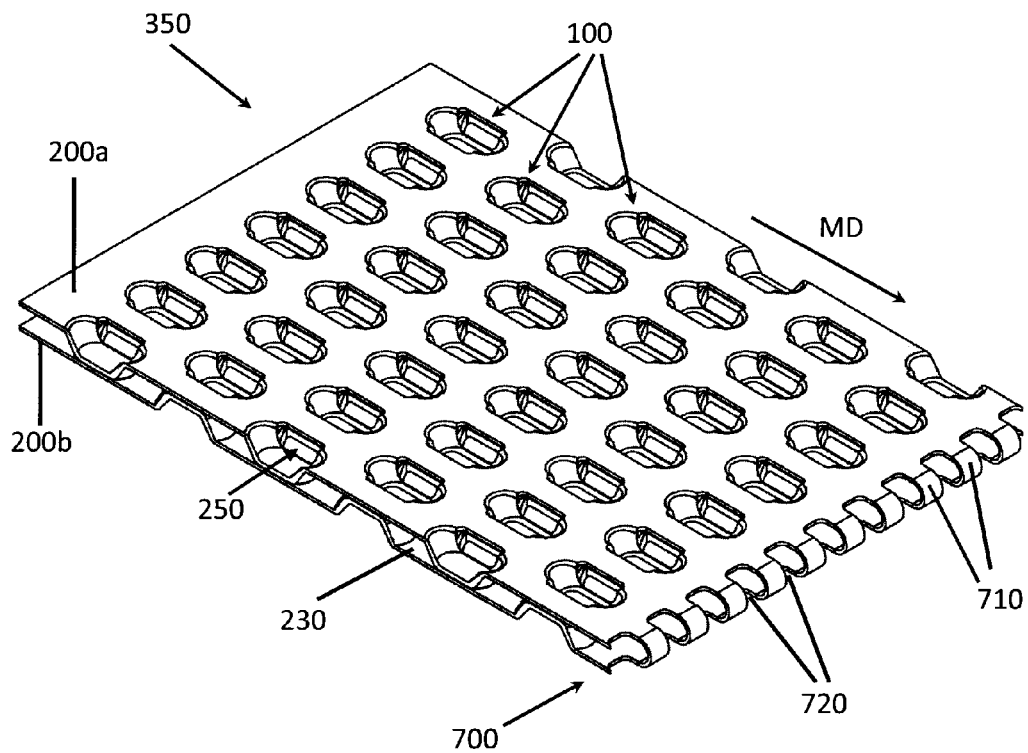
FIG. 26 is a perspective view of a seaming component in an embodiment of the invention.
Figure 27:
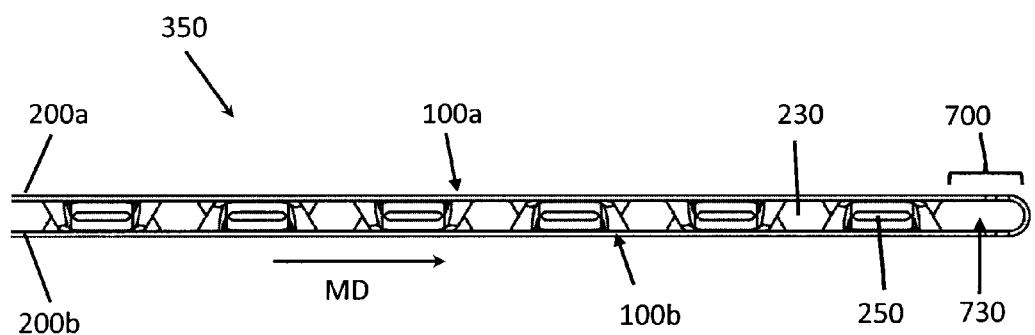
FIG. 27 is a cross-sectional view taken along the exposed edge of the seaming component shown in FIG. 26.

FIGS. 26 and 27 show a portion of one longitudinal end of a film fabric produced in accordance with the teachings of the invention and including a plurality of seaming loops as could be used to join the opposing fabric ends.

FIG. 26 is a perspective view of a portion of first seamable edge in a slit and profiled film 350 similar to that shown in FIGS. 5 to 13. As shown in FIG. 26, the film construction 350 includes a first film layer 200a located over layer 200b. The film layers 200a and 200b are profiled and slit in the manner described above in relation to FIGS. 5 through 13 to include protrusions 100 arranged in regularly spaced rows with land areas as previously described to provide channels such as 230 and aligned apertures such as 250 in the assembly 350. The film fabric portion shown in FIGS. 26 and 27 would be prepared specially or separately to provide both the protrusions shown in FIGS. 5 to 13 as well as a series of openings 720 between which are located land areas, which become seaming loops 710 when the film is folded at the seaming area 700 to provide channel 730. The openings 720 and land areas 710 are located so as to be oriented in the transverse direction relative to the intended travel direction (MD) of the film fabric and to provide a series of openings oriented transversely to the MD and at a specific pitch (frequency) relative to protrusions 100. When the film is folded following molding and slitting, openings 720 will present themselves as seam openings to accept a plurality of similarly sized film loops 710 from the opposing end of the fabric where a similar seaming element is installed. The assembled seaming element 350 is shown in cross-section in FIG. 27.

Figure 28:
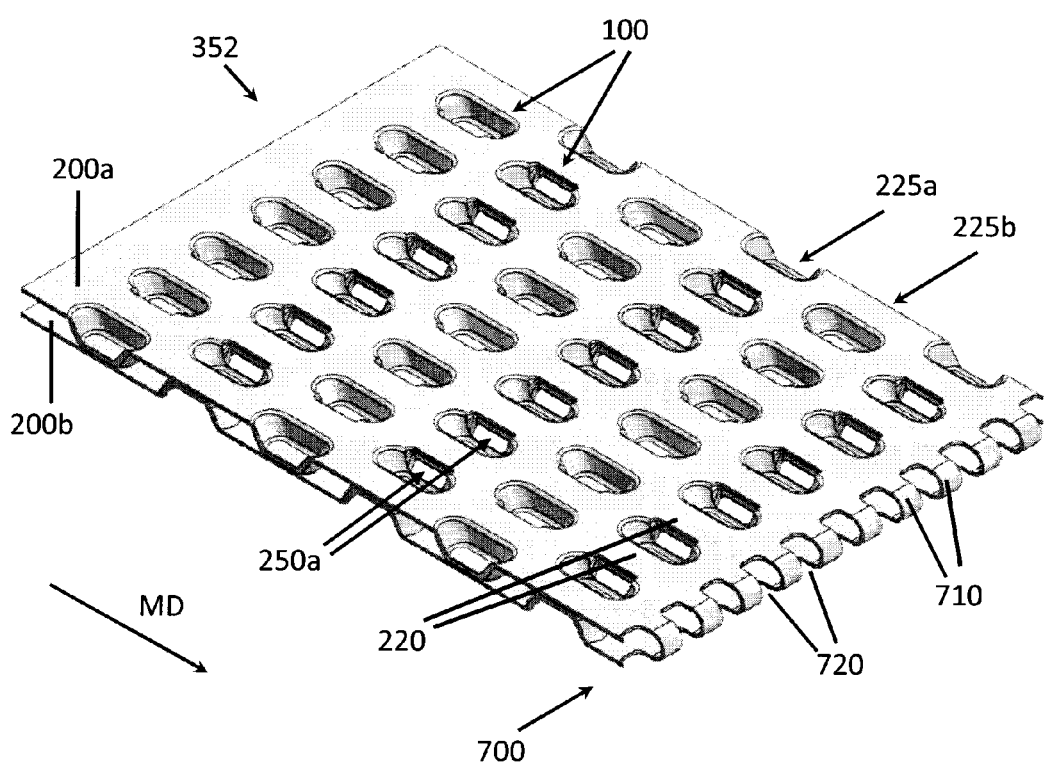
FIG. 28 is a perspective view of a seaming component in a further embodiment of the invention.
Figure 29:
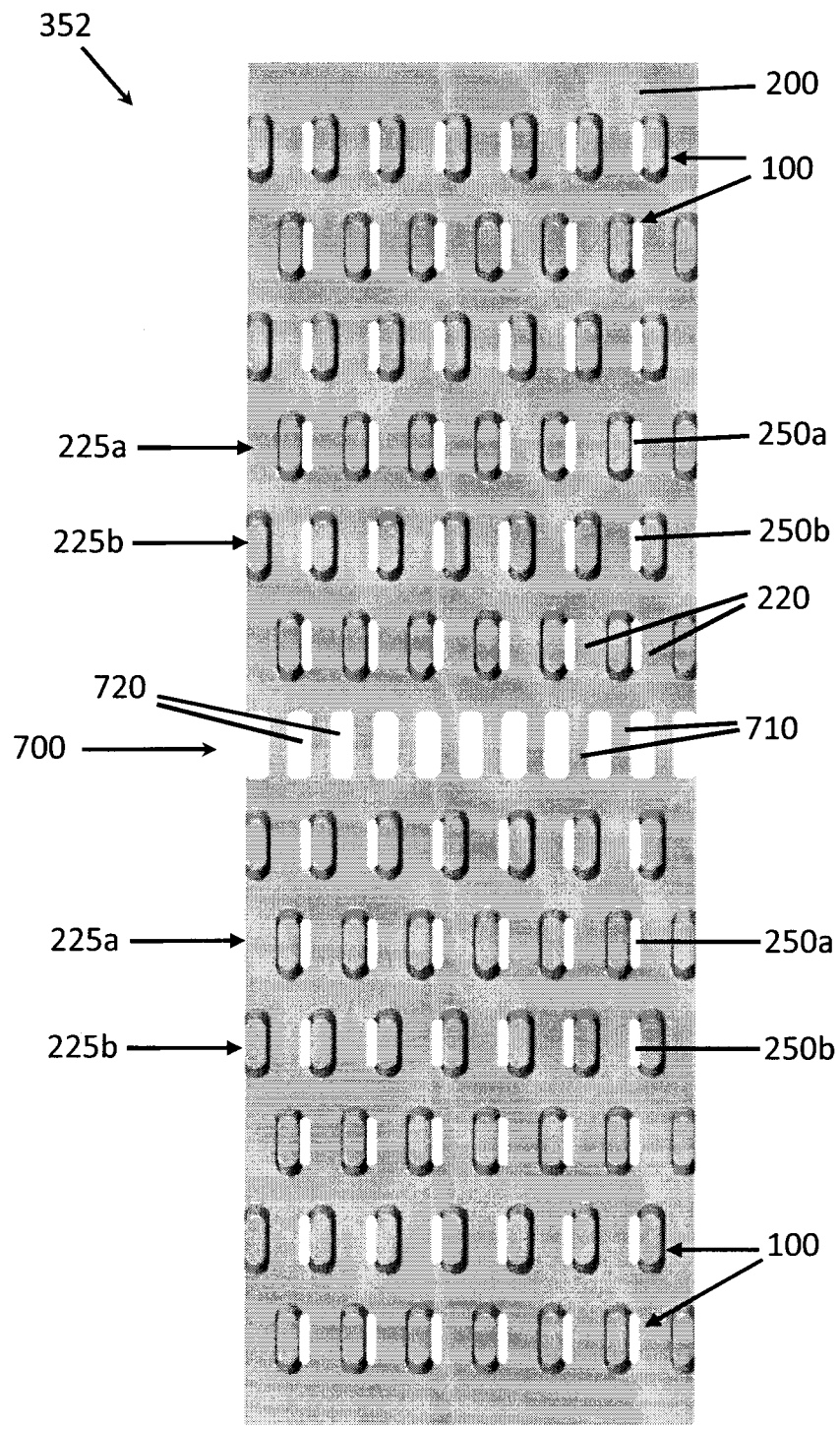
FIG. 29 is a plan view of the seaming component shown in FIG. 28.

FIGS. 28 and 29 illustrate a further embodiment of the film fabrics according to the present invention. In FIG. 28, a perspective view of a seaming element 352 similar to that shown in FIGS. 26 and 27 is shown. In this embodiment however, only one of the two side walls 130 or 135 of the protrusions 100 (FIGS. 5 to 13) has been slit to provide an aperture. This effect is seen more clearly in the plan view provided in FIG. 29. This provides two advantages: first, it leaves more material available to support the planar top surfaces 110; second, it provides an effective means of lowering air permeability in the film fabric, because only one wall is slit or removed. Note also that in this figure, the apertures 250a, 250b alternate location from one side of the protrusions to the other, proceeding in the MD from row 225a to 225b; this is not necessary, but does serve to balance the open area and air flow through the seaming element and similar films for which it is intended. Inspection of the slitting pattern provided in FIG. 29 also shows that it has mirror symmetry about the seam area which will be folded in the manner shown in FIGS. 26 and 27 to provide the seam area 700. Thus, each of the protrusions such as 100a will share a flow path provided by aperture 250a in cooperation with protrusions 100b and apertures 250b when the film is slit.

As a further alternative to the slitting pattern illustrated in FIGS. 28 and 29, it would also be possible to only slit the protrusions 100 in alternate rows so that, for example, the protrusions 100 in row 225a are completely closed, while those in row 225b are slit on one side as shown, or on both sides in the manner illustrated in FIGS. 5 to 13. In certain instances, such a slitting pattern may be beneficial in order to maximize the compression resistance of the assembled structure such as 352 or 300, or when there is need to provide the assembly with low permeability to fluid flow.

Inspection of FIGS. 28 and 29 reveals a further feature of the invention in relation to the seaming area. It has been found to be useful to provide a different loop and opening frequency for the seaming area from that of the embossing pattern in the main body of the film so as to increase the overall strength of the fabric and the seam.

It has been found that, if the CD pitch of the embossments, $P_E$ is related to the CD frequency of the seam loops $P_L$ according to the following relationship:

$$P_E(2m+1)=P_L \qquad (1)$$

where m and n are positive integers, then satisfactory results may be obtained. FIG. 29 shows this result most clearly and it can be seen that the loops 710 align with the land areas 220 in the film periodically. The relationship expressed in Equation (1) thus provides a mechanism by which the position of the seaming loops relative to the protrusions and apertures of the film can be adjusted so as to maximize seam strength.

The films and industrial textiles of the invention can be formed from a wide variety of materials which have been shown to be appropriate for use in continuous processes, such as filtration and conveying where they are exposed to harsh environmental conditions requiring resistance to abrasive wear, as well as chemical and hydrolytic degradation. Suitable materials include, but are not limited to, thermoplastic polymers, in particular polyesters such as hydrolysis stabilized polyethylene terephthalate (PET), polybutylene terephthalate (PBT), polyethylene naphthalate (PEN) as well as polycyclohexane dimethanol terephthalate (PCTA); olefins such as polypropylene (PP); polyamides (PA) such as PA-6, PA-6/6, PA-6/10, PA-6/12 and the like; polyphenylene sulphide (PPS) and polyether ether ketone (PEEK); thermoset polymers in particular polyimides; as well as various metals such as aluminum and alloys thereof.

By means of this invention, it is now possible to create a nonwoven fabric entirely from film, preferably a thermoplastic film which is profiled in a thermoforming process to provide a desired contour. Two layers of similarly profiled film can then be joined together such that the protrusion tops of a first layer rest on the land areas of the second in between corresponding protrusions. The film layers are then bonded together to create a two-layer 3-dimensional structure which is self-supporting and can resist compressive loading. Before bonding, the individual layers can be precision slit using e.g. a laser to provide the desired permeability; or this step can be taken after the layers have been bonded together. The structures are assembled such that a first film strip or panel is laid offset in relation to a second; the assembled film fabric structures are then joined in continuous offset fashion such that each joint between two adjacent strips in a first layer is located beneath a strip of the second layer such that the joins of one layer are covered by a corresponding strip or panel of the other. The film fabric is then built up to the desired width and length, and the adjacent strip joints are laid in overlapping fashion. In this manner, the fabric can be built up by continuously laying and bonding strips or panels of one layer so that each is offset in relation to the edge of a corresponding panel with which it is mated and bonded in the second overlying layer; CD assembly is preferred for this purpose, but the fabric strips may also be spirally or annularly wound in a similar fashion. It will also be appreciated that the protrusions, shown herein as elongated frustoconicals, ellipses or rectangular shapes may be oriented, in the assembled film fabric, in either the MD or running direction of the fabric, or in a direction transverse to this as needed or dictated by circumstances. The assembled film fabric is then cut to desired width and length and a seam of choice is provided to the opposing ends, such as by providing a similarly profiled seaming element to each end. The finished fabric can then be installed on the machine for which it is intended.

The invention claimed is:

1. A film for conveying in an industrial process, the film having
    (i) an upper surface and a lower surface; and
    (ii) a plurality of protrusions separated by land areas and defining a profile of the upper surface, wherein each protrusion has a protrusion body comprising:
    a top member having opposed first and second lateral edges and is supported by opposed compression resistant first and second end walls,
    at least one of the lateral edges cooperating with the end walls to define an aperture extending from the upper surface to the lower surface, each end wall having a base edge connected to an adjacent land area, wherein each protrusion has a configuration selected from at least one of:
    (a) curved first and second end walls; and
    (b) angled planar first and second end walls having reinforcing material under each of the angled planar first and second end walls.

2. A film according to claim 1, wherein the top member is substantially planar.

3. A film according to claim 1, wherein each aperture has a linear lower edge.

4. A film according to claim 1, wherein each base edge is substantially semicircular.

5. A film according to claim 1, wherein the protrusion body has a lower perimeter comprising a configuration selected from an ellipse and a circle.

6. A film according to claim 1, wherein the film comprises a material selected from a thermoplastic polymer, a thermoset polymer and a metal.

7. A film according to claim 6, wherein the material is a thermoplastic polymer selected from hydrolysis stabilized polyethylene terephthalate (PET), polybutylene terephthalate (PBT), polyethylene naphthalate (PEN), polycyclohexane dimethanol terephtalate (PCTA), polypropylene (PP), a polyamide selected from PA-6, PA-6/6, PA-6/10 and PA-6/12, polyphenylene sulphide (PPS) and polyether ether ketone (PEEK).

8. A film according to claim 7, wherein the material is a thermoplastic polymer and comprises polyethylene terephthalate.

9. A film according to claim 6, wherein the material is a thermoset polymer and comprises a polyimide.

10. A film according to claim 6, wherein the material is a metal selected from aluminum and alloys thereof.

11. A nonwoven industrial fabric for conveying in an industrial process, comprising at least one layer of a film, the film having
    (i) an upper surface and a lower surface; and
    (ii) a plurality of protrusions separated by land areas and defining a profile of the upper surface, wherein each protrusion has a protrusion body comprising a top member having opposed first and second lateral edges and is supported by opposed compression resistant first and second end walls, at least one of the lateral edges cooperating with the end walls to define an aperture extending from the upper surface to the lower surface, each end wall having a base edge connected to an adjacent land area, wherein each protrusion has a configuration selected from at least one of:
(a) curved first and second end walls; and
(b) angled planar first and second end walls having reinforcing material under each of the angled planar first and second end walls.

12. A nonwoven industrial fabric comprising at least one layer of a film according to claim 1.

13. A fabric according to claim 11, further comprising a fabric body having a first seamable end and a second seamable end, a first seaming element provided at the first seamable end and a second seaming element provided at the second seamable end, wherein the first and second seaming elements are constructed and arranged to be secured together to form a seam.

14. A fabric according to claim 13, wherein at least one of the first seaming element and the second seaming element is integrally constructed with the fabric body at the respective seamable end.

15. A fabric according to claim 13, wherein each seaming element comprises loops and openings arranged at a selected frequency, and a pitch PE of the protrusions across a width of each seamable end is related to a frequency PL of seaming loops across said width according to the following equation:

$$PE(2m+1)=nPL$$

where m and n are positive integers.

16. A method of constructing a nonwoven industrial fabric for conveying in an industrial process, the method comprising the steps of
(a) providing a film having an upper surface and a lower surface;
(b) selectively applying pressure to selected portions of the film to form protruding embossed areas separated by land areas, creating a contoured profile in the upper surface, each protruding embossed area comprising a top member having opposed sidewalls connected to the top member at first and second lateral edges;
(c) selectively cutting and removing material from at least one of the sidewalls of at least some of the protruding embossed areas to define protrusions each having a body supported by opposed compression resistant first and second end walls and to define at least one apertures extending from the upper surface to the lower surface, wherein each end wall has a base edge connected to an adjacent land area, wherein each protrusion has a configuration selected from at least one of:
(i) curved first and second end walls; and
(ii) angled planar first and second end walls having reinforcing material under each of the angled planar first and second end walls;
(d) preparing a first and a second layer of the film;
(e) aligning selected protrusions of the first layer with land areas of the second layer, and aligning selected protrusions of the second layer with land areas of the first layer; and
(f) securing the first layer to the second layer to produce a multilayer fabric.

17. A method according to claim 16, wherein step (a) further comprises
selectively cutting the film to provide a plurality of slits extending from the upper surface through to the lower surface;
the land areas in step (b) are provided between adjacent pairs of the slits; and
the cutting in step (c) is performed adjacent to the slits.

18. A method of constructing a nonwoven industrial fabric for conveying in an industrial process, the method comprising the steps of
(a) providing a film having an upper surface and a lower surface;
(b) selectively applying pressure to selected portions of the film to form protruding embossed areas separated by land areas, creating a contoured profile in the upper surface, each protruding embossed area comprising a top member having opposed sidewalls connected to the top member at first and second lateral edges;
(c) preparing a first and a second layer of the film;
(d) aligning selected protruded embossed areas of the first layer with land areas of the second layer, and aligning selected protruded embossed areas of the second layer with land areas of the first layer;
(e) securing the first layer to the second layer; and
(f) selectively cutting and removing material from at least one of the sidewalls of at least some of the protruding embossed areas to define protrusions each having a body supported by opposed compression resistant first and second end walls and to define at least one aperture extending from the upper surface to the lower surface, wherein each end wall has a base edge connected to an adjacent land area, wherein each protrusion has a configuration selected from at least one of:
(i) curved first and second end walls; and
(ii) angled planar first and second end walls having reinforcing material under each of the angled planar first and second end walls.

19. A method according to claim 18, wherein the film comprises a material that is a thermoplastic polymer selected from hydrolysis stabilized polyethylene terephthalate (PET), polybutylene terephthalate (PBT), polyethylene naphthalate (PEN), polycyclohexane dimethanol terephtalate (PCTA), polypropylene (PP), a polyamide selected from as PA-6, PA-6/6, PA-6/10 and PA-6/12, polyphenylene sulphide (PPS) and polyether ether ketone (PEEK).

20. A method according to claim 18, wherein step (b) comprises providing each protruding embossed area with a lower perimeter comprising a configuration selected from an ellipse and a circle.

* * * * *